United States Patent
Luft et al.

(10) Patent No.: US 9,433,033 B2
(45) Date of Patent: Aug. 30, 2016

(54) AD-HOC COMMUNICATION RADIO MODULE, AD-HOC COMMUNICATION DEVICE AND METHOD FOR CONTROLLING AN AD-HOC COMMUNICATION RADIO MODULE

(75) Inventors: Achim Luft, Braunschweig (DE); Andreas Schmidt, Braunschweig (DE)

(73) Assignee: INTEL DEUTSCHLAND GMBH, Neubiberg (DE)

(*) Notice: Subject to any disclaimer, the term of this patent is extended or adjusted under 35 U.S.C. 154(b) by 2 days.

(21) Appl. No.: 12/812,068

(22) PCT Filed: Jan. 9, 2008

(86) PCT No.: PCT/DE2008/000019
§ 371 (c)(1),
(2), (4) Date: Jul. 8, 2010

(87) PCT Pub. No.: WO2009/086796
PCT Pub. Date: Jul. 16, 2009

(65) Prior Publication Data
US 2010/0284337 A1    Nov. 11, 2010

(51) Int. Cl.
*H04W 84/18* (2009.01)
*H04W 72/04* (2009.01)
*H04L 29/06* (2006.01)
*H04W 88/02* (2009.01)

(52) U.S. Cl.
CPC .......... *H04W 84/18* (2013.01); *H04L 29/0602* (2013.01); *H04W 72/04* (2013.01); *H04W 88/02* (2013.01)

(58) Field of Classification Search
CPC ... H04L 5/003; H04L 12/2801; H04L 29/06; H04L 29/0602; H04L 29/06027; H04L 29/0617; H04W 72/04; H04W 72/0406; H04W 84/18; H04W 88/02; H04W 88/04; H04W 88/06
See application file for complete search history.

(56) References Cited

U.S. PATENT DOCUMENTS

| | | | |
|---|---|---|---|
| 2003/0018831 A1* | 1/2003 | Lebena | 709/328 |
| 2004/0177361 A1* | 9/2004 | Bernhard et al. | 719/321 |
| 2005/0032515 A1* | 2/2005 | Mastio | 455/423 |
| 2005/0063416 A1* | 3/2005 | Shin et al. | 370/465 |
| 2005/0068965 A1 | 3/2005 | Lin et al. | |
| 2005/0239453 A1 | 10/2005 | Vikberg et al. | |
| 2006/0019656 A1 | 1/2006 | Gallagher et al. | |
| 2006/0041470 A1* | 2/2006 | Filho et al. | 705/14 |
| 2006/0217153 A1* | 9/2006 | Coles et al. | 455/558 |
| 2006/0258355 A1 | 11/2006 | Olvera-Hernandez et al. | |
| 2007/0019672 A1* | 1/2007 | Guthrie | 370/466 |

(Continued)

OTHER PUBLICATIONS

Bluetooth, "Specification of the Bluetooth System, Wireless connections made easy", Version 1.1, Feb. 22, 2001.*

(Continued)

*Primary Examiner* — Khoa Huynh
(74) *Attorney, Agent, or Firm* — Schwabe, Williamson & Wyatt, P.C.

(57) ABSTRACT

An ad-hoc communication radio module is provided, which may include at least one of an ad-hoc communication reception circuit; and an ad-hoc communication transmission circuit; and an ad-hoc communication-protocol-stack-external control interface for the ad-hoc communication-protocol-stack-external control of the ad-hoc communication reception circuit or of the ad-hoc communication transmission circuit.

25 Claims, 15 Drawing Sheets

(56) References Cited

U.S. PATENT DOCUMENTS

| | | |
|---|---|---|
| 2008/0046898 A1* | 2/2008 | Molina et al. .................. 719/330 |
| 2008/0153510 A1* | 6/2008 | Sulander et al. ........... 455/456.3 |
| 2008/0310332 A1* | 12/2008 | Hansen et al. ................. 370/310 |
| 2009/0104913 A1* | 4/2009 | Karls et al. .................... 455/450 |

OTHER PUBLICATIONS

English translation of International Preliminary Report on Patentability of PCT/DE2008/000019 dated Aug. 10, 2010.

International Search Report of PCT/DE2008/000019 dated Sep. 19, 2008.

Specification of the Bluetooth System, Wireless connections made easy, Core, Version 1.1, Part I Specification of he Bluetooth System, vol. 1, Feb. 22, 2010, pp. 827-884, p. 831-p. 832, p. 864-p. 870.

Written Opinion received for PCT Patent Application No. PCT/DE2008/000019, mailed Sep. 19, 2008, 12 pages, includes 6 pages of English translation.

Office Action in German Appl. No. 112008003065 issued on May 29, 2013; 23 pages.

* cited by examiner

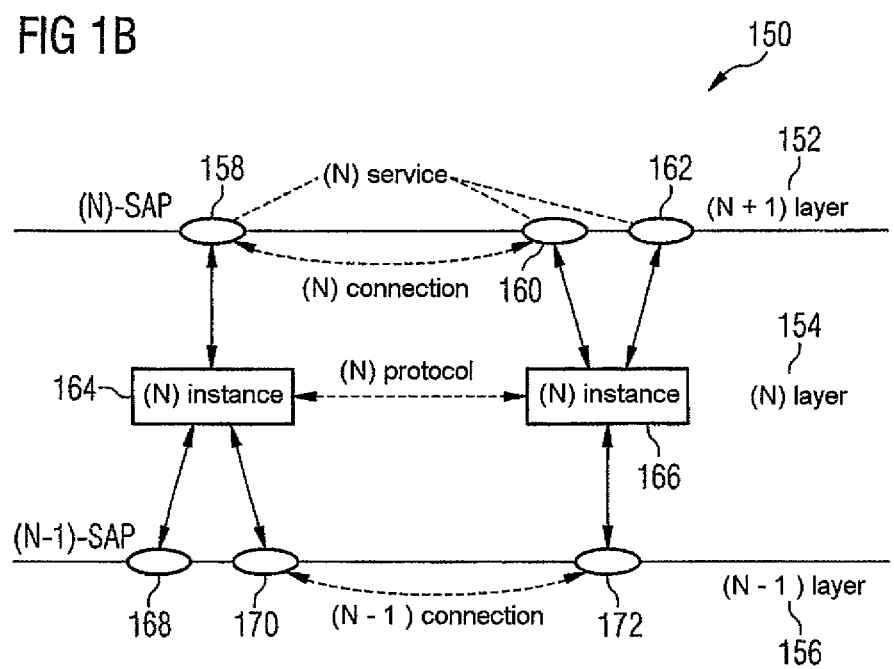

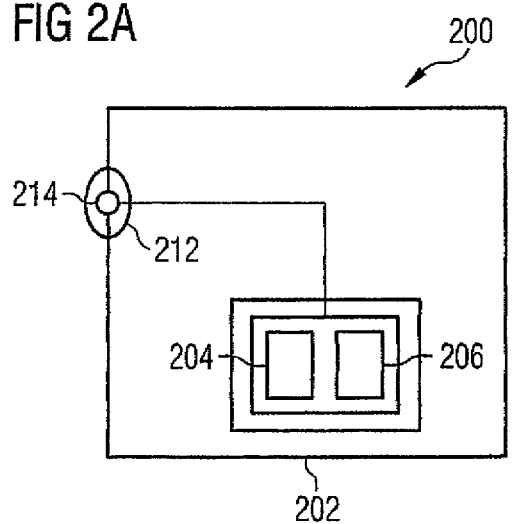
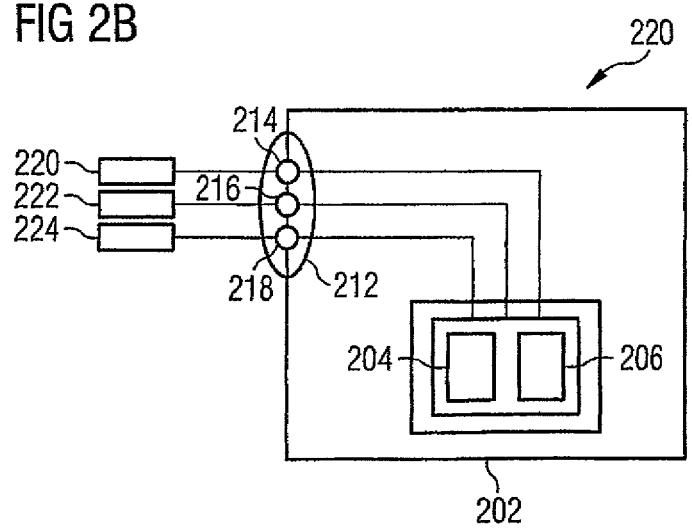

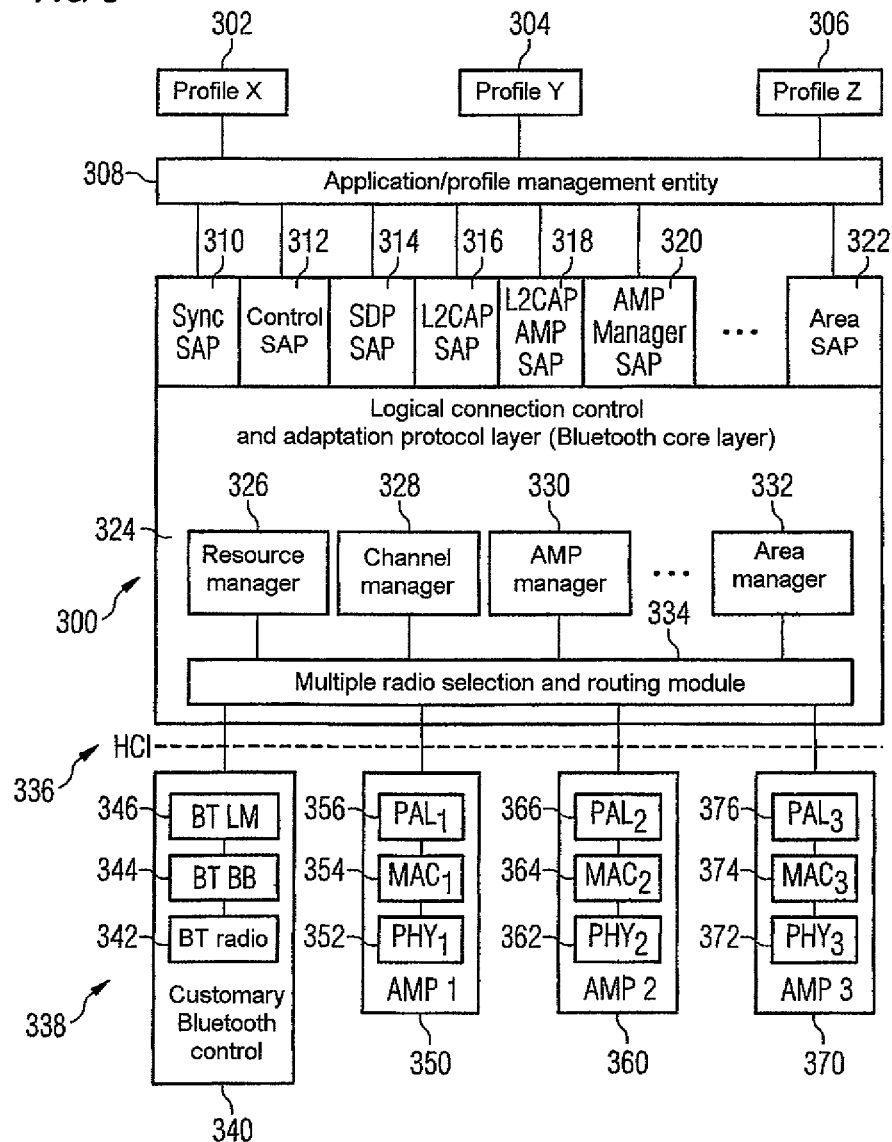

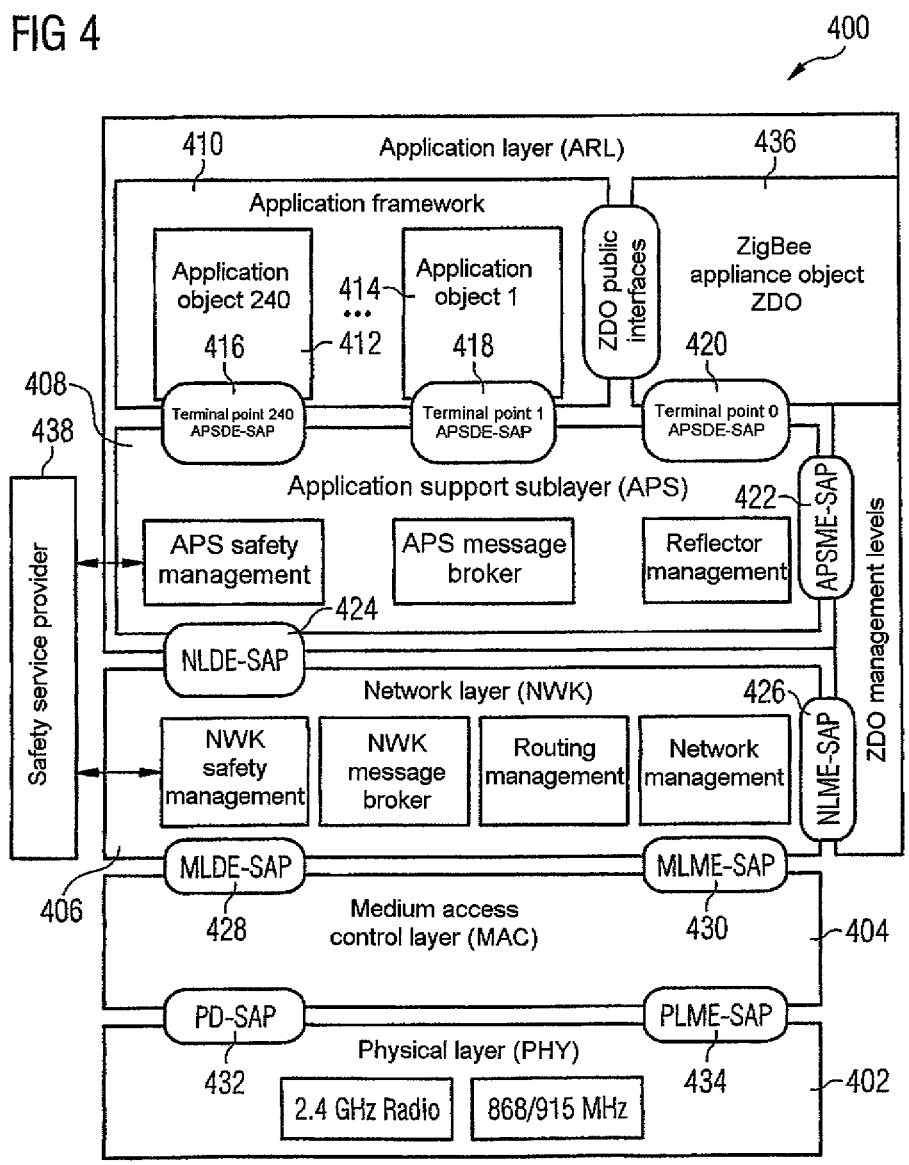

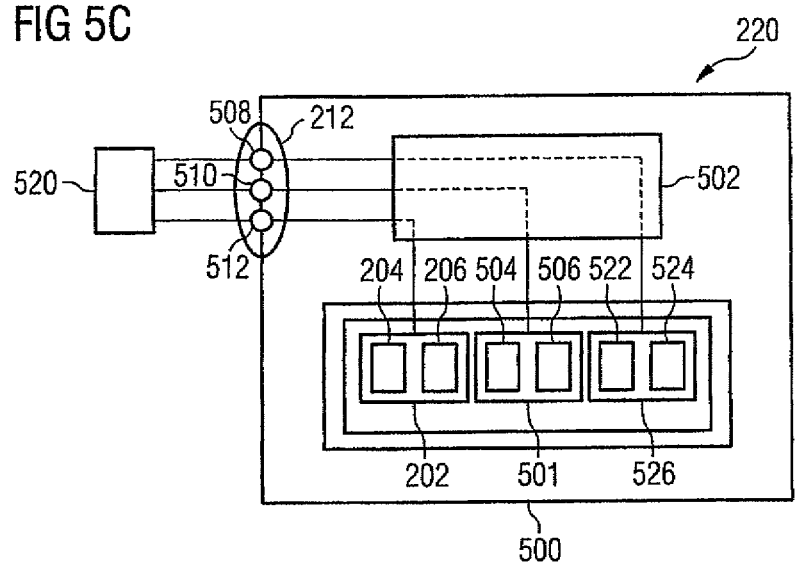
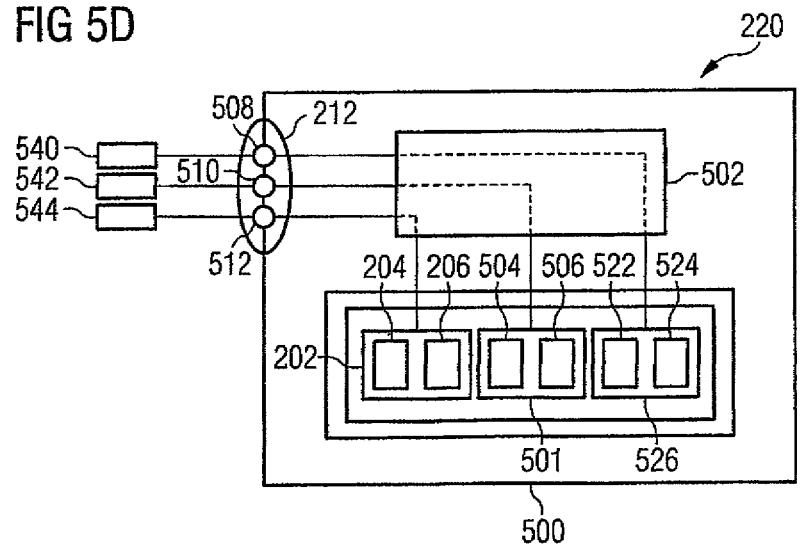

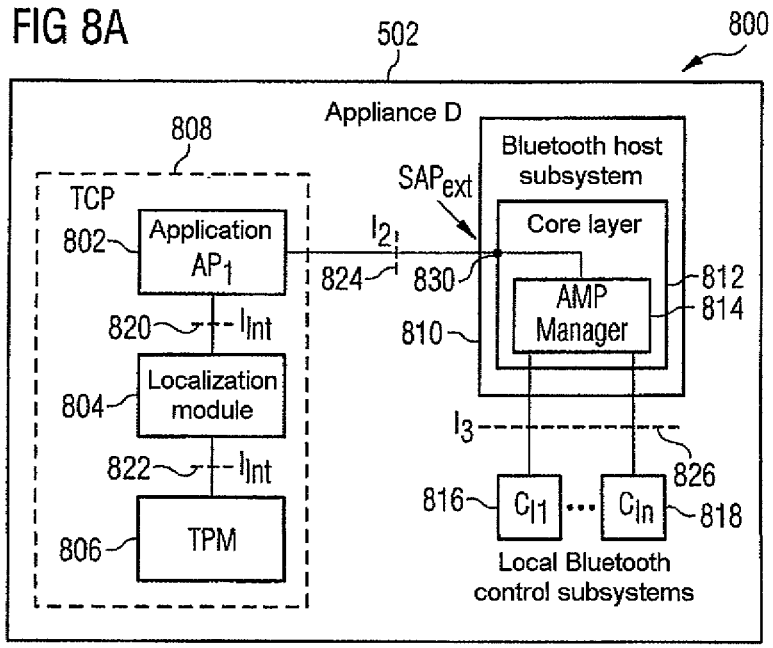
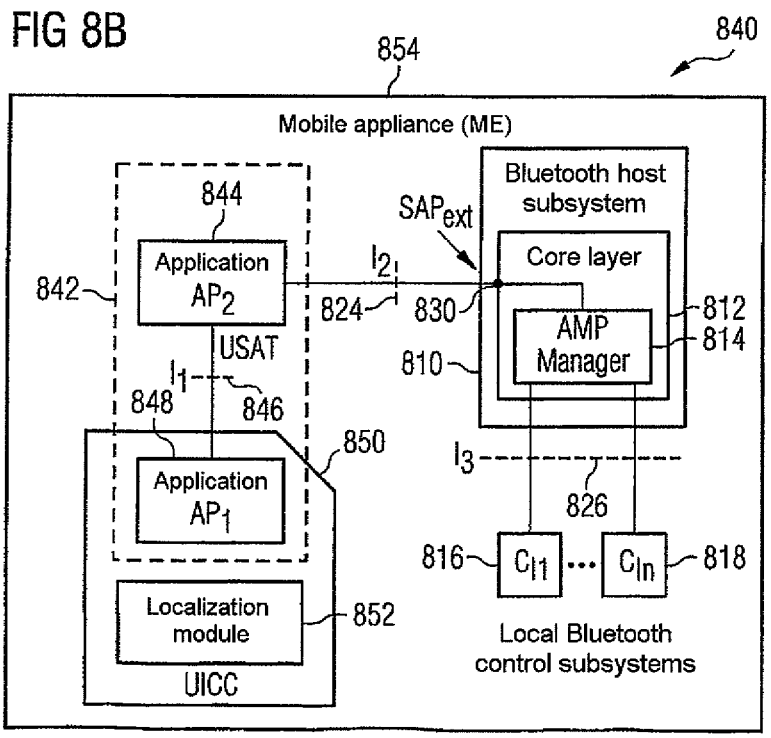

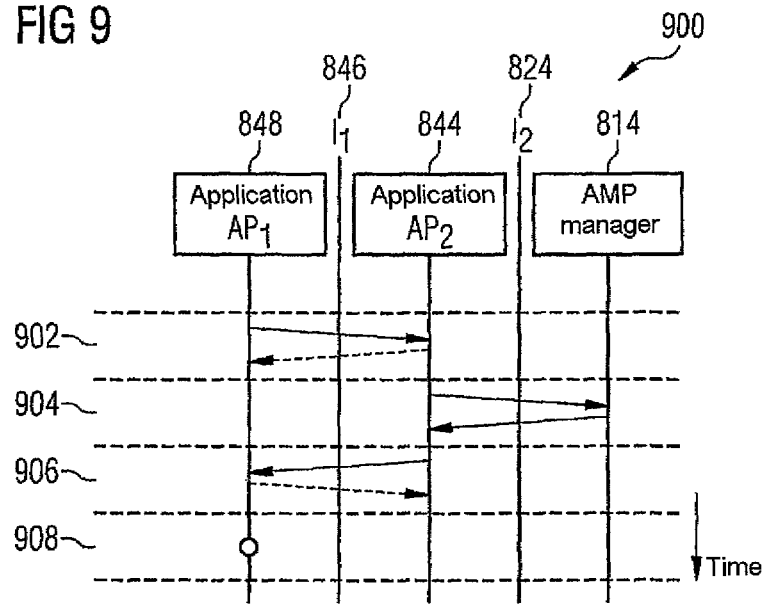
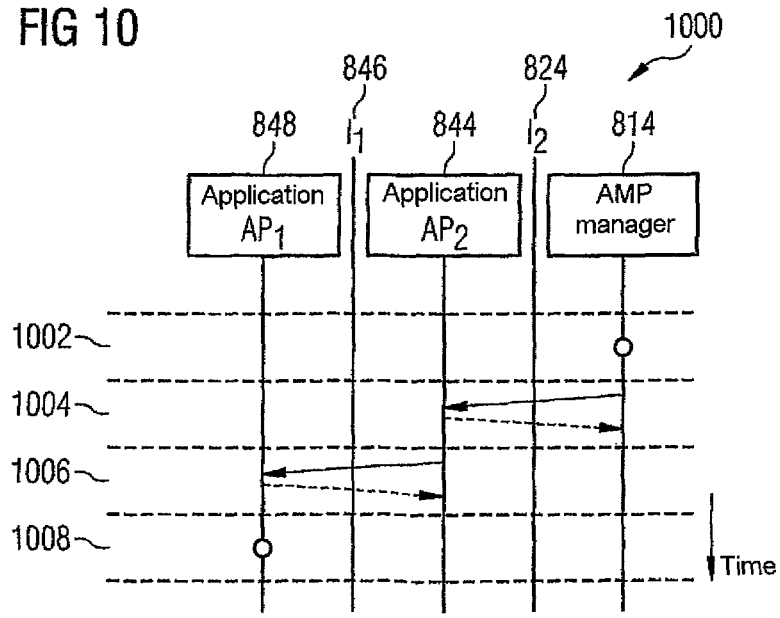

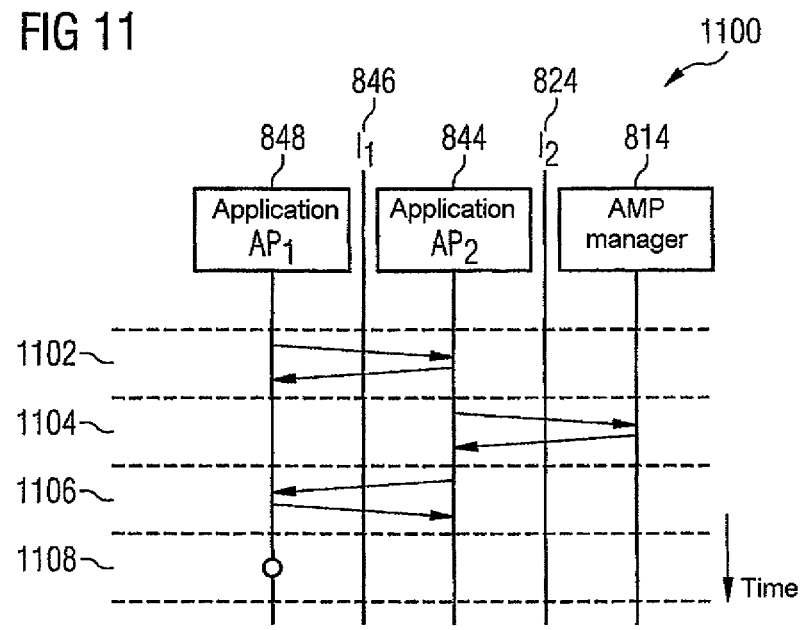

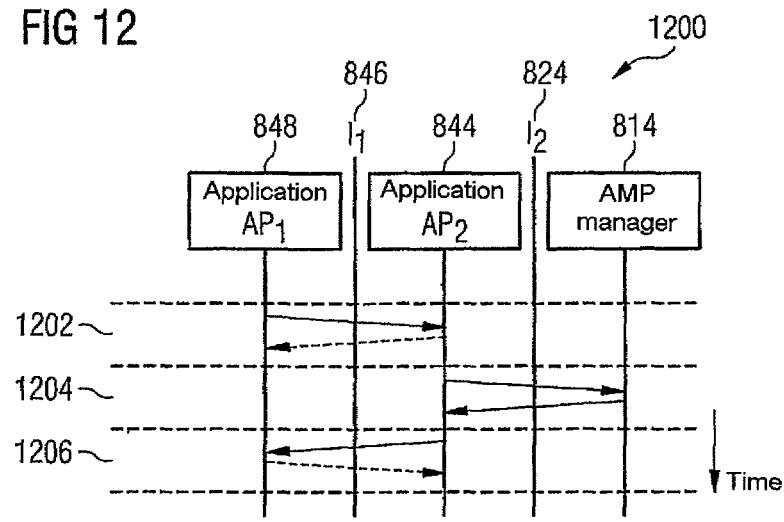
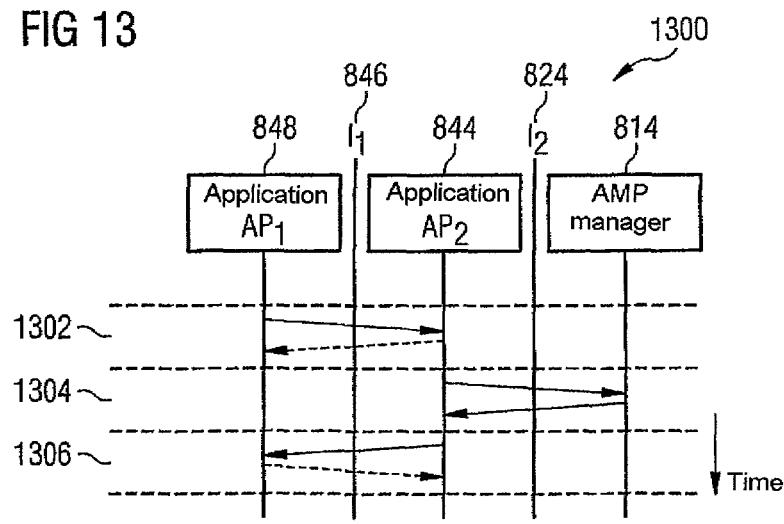

| Identifier *6F 38* | Structure: transparent | Obligatory |
|---|---|---|
| SFI: *04* | | |
| File size: X bytes, (X ≥ 1) | Update activity: low | |
| Access conditions<br>    READ          PIN<br>    UPDATE       ADM<br>    DEACTIVATE  ADM<br>    ACTIVATE    ADM | | |

| Bytes | Description | M/O | Length |
|---|---|---|---|
| 1 | Services No 1 to No 8 | M | 1 byte |
| 2 | Services No 9 to No 16 | O | 1 byte |
| 3 | Services No 17 to No 24 | O | 1 byte |
| 4 | Services No 25 to No 32 | O | 1 byte |
| etc. | | | |
| X | Services No (8X - 7) to No (8X) | O | 1 byte |

Service contents

Service No 1: local telephone book
Service No 2: fixed dialing numbers (FDN)
Service No 3:     direct dial 2
Service No 4:     service dialing numbers (SDN)
Service No 5:     direct dial 3

⋮

Service No 70: data download using USSD and USSD application mode
Service No 71: equivalent HPLMN
Service No 72: additional terminal profile after UICC activation
Service No 73: equivalent HPLMN presentation display
Service No 74: last RPLMN selection display
Service No 75: basic Bluetooth AMP control
Service No 76: extended Bluetooth AMP control

1402

AD-HOC COMMUNICATION RADIO MODULE, AD-HOC COMMUNICATION DEVICE AND METHOD FOR CONTROLLING AN AD-HOC COMMUNICATION RADIO MODULE

RELATED APPLICATIONS

The present application is a national stage entry according to 35 U.S.C §371 of PCT application No.: PCT/DE2008/000019 filed on Jan. 9, 2008.

TECHNICAL FIELD

The invention relates to an ad-hoc communication radio module, an ad-hoc communication device and a method for the external control of an ad-hoc communication radio module.

BACKGROUND

It is desirable to control an ad-hoc communication radio module via an external interface.

BRIEF DESCRIPTION OF THE DRAWINGS

In the drawings, like reference characters generally refer to the same parts throughout the different views. The drawings are not necessarily to scale, emphasis instead generally being place upon illustrating the principles of the invention. In the following description, various embodiments of the invention are described with reference to the following drawings, in which:

FIG. 1B shows the principle of service access points based on an exemplary embodiment of the invention;

FIGS. 2A and 2B show the control of a communication radio module based on an exemplary embodiment of the invention;

FIG. 3 shows a possible Bluetooth system architecture following the integration of further transmission/reception modules based on an exemplary embodiment of the invention;

FIG. 4 shows ZigBee protocol layers based on an exemplary embodiment of the invention;

FIGS. 5A, 5B, 5C, 5D and 5E show the control of a plurality of communication radio modules based on various exemplary embodiments of the invention;

FIGS. 8A, 8B and 8C show function blocks in a first overall system and a second overall system based on an exemplary embodiment of the invention;

FIG. 9 shows a transaction chart A based on an exemplary embodiment of the invention;

FIG. 10 shows a transaction chart B based on a further exemplary embodiment of the invention;

FIG. 11 shows a transaction chart C based on an exemplary embodiment of the invention;

FIG. 12 shows a transaction chart D based on an exemplary embodiment of the invention;

FIG. 13 shows a transaction chart E based on an exemplary embodiment of the invention;

FIG. 14 shows a service table based on an exemplary embodiment of the invention.

DETAILED DESCRIPTION

Figure 1A:
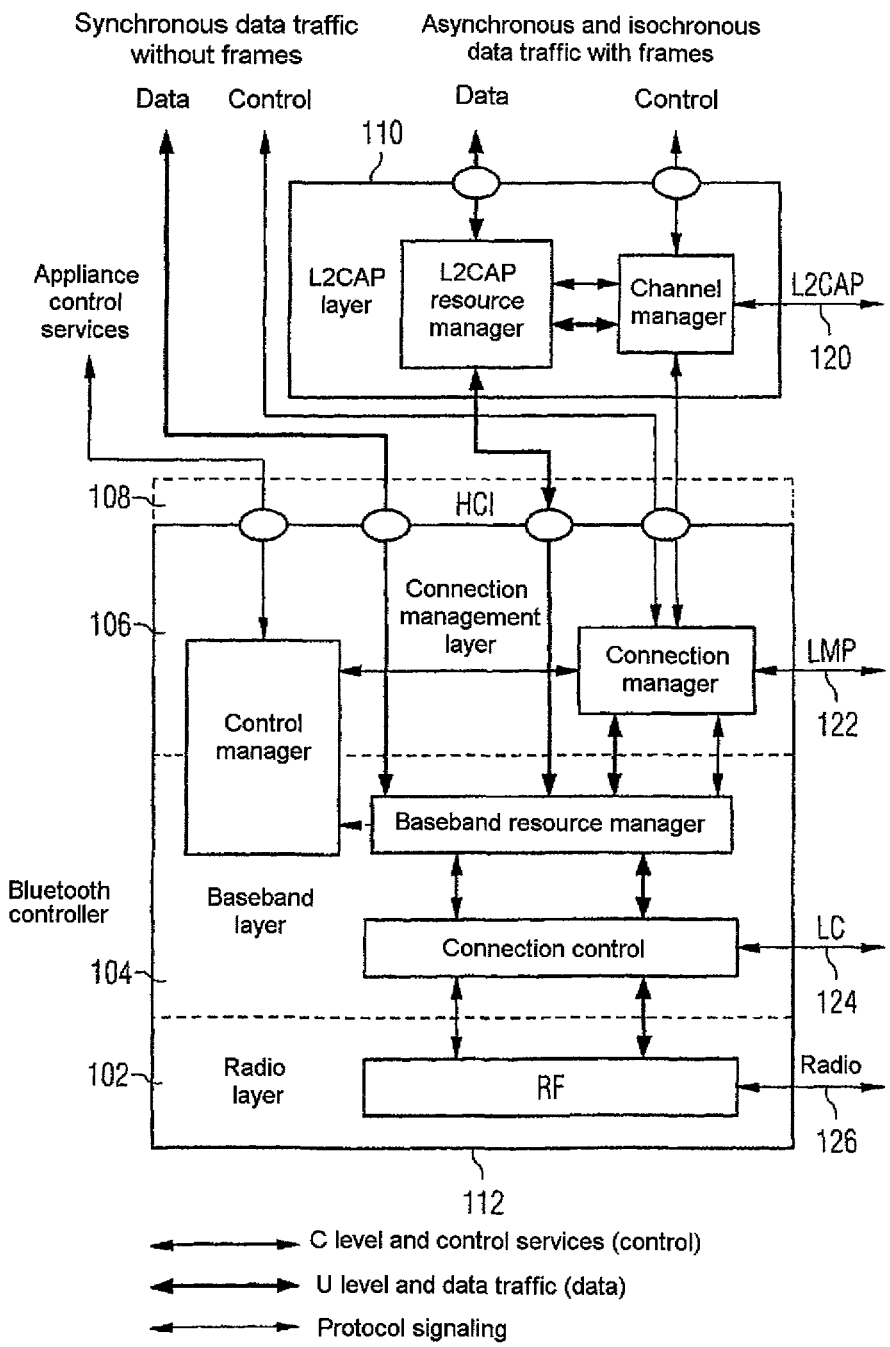
FIG. 1A shows Bluetooth protocol layers based on an exemplary embodiment of the invention.

The following detailed description refers to the accompanying drawings that show, by way of illustration, specific details and embodiments in which the invention may be practiced.

In the course of this description, the terms "connected" and "coupled" are used to describe both a direct and an indirect connection and a direct or indirect coupling. In the figures, identical or similar elements are provided with identical reference symbols where this is expedient.

In the course of this description, a circuit is understood to mean any kind of hardwired logic or program logic, for example. A circuit may therefore be a programmable processor (for example a programmable microprocessor (for example a Complex Instruction Set Controller (CISC) microprocessor or a Reduced Instruction Set Controller RISC) microprocessor), for example, which implements the respective functionality of the circuit (for example using an appropriately set up program code). A plurality of circuits may be provided in integrated form in a common circuit or in separate circuits. Thus, in one exemplary embodiment, provision may be made for the functionalities of a Bluetooth controller subsystem, for example, to be implemented in one or more microprocessors of the Bluetooth controller subsystem.

In addition, the terms "layer" and "level" are used synonymously in reference to protocol layers. Depending on the context, the term "level" is also used for a level within a layer.

Next-generation Bluetooth systems will in future include a multiplicity of different transmission/reception modules, some of which deliver significantly higher data rates than the Bluetooth transmission/reception module established today. The individual transmission technologies for these new transmission/reception modules may indeed be different. In the Bluetooth SIG (Special Interest Group), they are combined under the name AMP (Alternate MAC (Medium Access Control) PHY (Physical Layer)). At present, the Bluetooth SIG is even discussing introducing a logical AMP control unit into the Bluetooth core layer (session layer), which is also referred to as an AMP manager. At the current level of discussions, the next-generation Bluetooth (i.e. the established Bluetooth transmission technology plus one or more AMPs) also remains a self-contained system. Service access points SAPs for controlling the AMP manager functionality externally are not emphasized as yet.

Bluetooth is used in preference particularly in mobile appliances on account of its low power consumption, the small component size and the comparatively low costs of Bluetooth modules. Even today, the majority of mobile radio terminals are supplied with Bluetooth wireless technology. In the meantime, users have recognized the added value of this technology and are using it to an ever greater degree.

The wireless coupling of mobile radio terminals to hands-free devices in cars or of mobile radio terminals to wireless headsets (the mono variant for telephony or the stereo variant for music transmission) are just two of the currently most popular areas of application for Bluetooth.

The planned AMP extensions (for the purpose of higher data rates) will probably again provide for an increase in the spread of Bluetooth systems in mobile radio terminals and at the same time stimulate the development of new applications (for example the development of new Bluetooth profiles).

On the basis of various exemplary embodiments of the invention, the effect achieved is that of opening the previously self-contained Bluetooth system, for example for the purpose of control by trustworthy applications.

In line with one exemplary embodiment, control of an ad-hoc radio communication module is designed to be via an interface which is external to the ad-hoc radio communication protocol. Furthermore, the control is described using the example of applications which use a new, external interface for access.

This would allow the following effects to be achieved:

by way of example, an application which is controlled by a network operator (and hence trustworthy) on an intelligent mobile radio chipcard, such as a Subscriber Identity Module (SIM) card or Universal Integrated Circuit Card (UICC), could control particular AMP manager functionalities.

By way of example, a TPM (Trusted Platform Module) in a mobile radio terminal could control applications in a trustworthy manner in order to control particular AMP manager functionalities.

Specifically, said trustworthy applications can control the switching-on and switching-off of particular AMPs under prescribed constraints.

Another example would be the control of the use of particular groups of frequency bands for an AMP and/or transmission powers on the basis of the whereabouts of the mobile radio terminal (for example on the basis of the country identifier of the mobile radio network) by said trustworthy applications. Regionally different conditions from the regulating authorities could therefore be reliably met without the user needing to bother about it.

Exemplary embodiments of the invention relate to parts of the layers based on ISO/OSI (International Organization for Standardization/Open System Interconnection) 7-layer model.

The ISO/OSI model is an ISO-standardized seven-layer reference model for describing manufacturer-independent communication systems. OSI stands for Open System Interconnection (Open system for communication links). The ISO/OSI model is used as a resource for describing open communication between various network appliances from different manufacturers. Most freely usable network protocols are based on this reference model, an example of such a network protocol being TCP/IP.

The seven layers are defined such that they are based on one another and every single one can be used independently of the others. The layers defined by the OSI can be divided into two main groups:

layers one to four represent the transport system; these define the communication channels physically and logically;

layers five to seven represent the application system; they are used predominantly to show information.

The layers are usually shown such that layer 1 appears at the bottom and layer 7 at the top (cf. table 1). The individual layers cannot always be clearly separated from one another in real systems.

TABLE 1

The ISO layer model

| No. | English Description | German Description | Examples |
|---|---|---|---|
| 7 | Application Layer | Anwendungsschicht (engl.: Application Layer) | Web Browser, e-mail program |
| 6 | Presentation Layer | Darstellungsschicht (engl.: Presentation Layer) | HTML, XML, MIME |
| 5 | Session Layer | Sitzungsschicht (engl.: Session Layer) | http, FTP, POP3, SMTP |
| 4 | Transport Layer | Transportschicht3 (engl.: Transport Layer) | TCP |
| 3 | Network Layer | Netzwerkschicht (engl.: Network Layer) | IP |
| 2 | Data Link Layer | Verbindungsschicht (engl.: Data Link Layer) | PPP |
| 1 | Physical Layer | Physikalische Schicht (engl.: Physical Layer) | IEEE 802 |

The lower four layers of the ISO/OSI model will be discussed in somewhat more detail at this juncture, since they are relevant to the problems presented in this description.

The transport layer (layer 4) provides the option of setting up and clearing down connections in due fashion, synchronizing connections and distributing data packets over a plurality of connections (multiplexing). This layer connects the transport system to the application system of the ISO/OSI model (see above). Furthermore, data packets are segmented and packets are prevented from jamming.

The network layer (layer 3) performs the relaying and delivery of data packets. It also compiles routing tables and performs the routing per se. Packets to be forwarded are provided with a new intermediate destination address and are not sent to higher layers.

Different network topologies are also coupled on this level.

The data link layer (layer 2) organizes and monitors the access to the transmission medium. The bit stream is segmented on this level and is combined into packets. Furthermore, data can be subjected to an error check; for example, a checksum can be attached to a packet. It is also possible for the data to be compressed. Further features are sequence monitoring and time monitoring and also flow control.

The data link layer can again be split into two sublayers. The upper sublayer is referred to as the LLC (Logical Link Control) layer and the lower sublayer is referred to as the MAC (Medium Access Control) layer.

The functionality of the MAC layer may be in a different form depending on the transmission medium (physical layer) used. Its main tasks usually include:

Recognizing where data packets (frames) start and stop in the bit stream received from the physical layer (when data are received).

Dividing the data stream into data packets (frames) and possibly inserting supplementary bits into the data packet structure so that the start and end of a data packet can be detected in the receiver (when data are transmitted).

Discerning transmission errors, for example by inserting a checksum when sending or by means of appropriate control calculations (when receiving).

Inserting or evaluating MAC addresses in the transmitter or receiver.

Access control (e.g. which of the instances accessing the physical medium has the right to transmit?).

The physical layer (layer 1) defines plug connections, wavelengths and signal levels. The bit sequences are converted into transmittable formats in this layer. The properties of the transmission media (cable, radio, optical fiber) are also defined here.

The properties of Bluetooth technology which are relevant to the described exemplary embodiments of the invention are explained in more detail below.

The lower protocol layers of the Bluetooth Architecture conventionally are shown in FIG. 1A: the three lower layers (physical layer, in this case: Radio Layer 102, data link layer, in this case: Baseband Layer 104 and network layer, in this case: Link Management Layer LML 106) are frequently combined in literature to form the subsystem "Bluetooth controller" 112. The transport layer situated above the Bluetooth controller 112 is terminated by the optional "Host to Controller Interface" (HCI) 108 shown in FIG. 1A. The HCI 108 is used in the general Bluetooth Architecture as a service access point (SAP) for the Bluetooth controller 112. The principle of SAPs is explained further below with reference to FIG. 1B.

Above the HCI 108, there is situated the session layer 110 called L2CAP (Logical Link Control and Adaptation Protocol). However, it is needed only for ACL connections (ACL: asynchronous, connectionless and packet-switching service); SCO connections (SCO: synchronous, connection-oriented and circuit-switched service), which are oriented to ensuring efficient voice transmission at a constant data rate of usually 64 kbit/s, for example, do not require L2CAP 110. Unfortunately, it is not always possible in practice to observe the strict division of the ISO/OSI model. In general Bluetooth Architecture, parts of the network layer (in this case: Link Management Layer) 106 also extend into the data link layer, (in this case: Baseband Layer) 104.

The presentation layer and the application layer are not shown in FIG. 1A for the sake of simplicity.

Control signals (for device control and transport control) are represented by the medium-gray connecting arrows ("C level" or "C plane"), while the data signals are represented by black connecting arrows ("U plane"). Interoperability in Bluetooth is guaranteed by virtue of firstly a clean interface being defined between the Bluetooth controller 112 (all layers from LML 106 downwards) and the Bluetooth host (the layers from L2CAP 110 upwards) within a Bluetooth system (namely HCI 108, for example) and secondly the interchange of protocol messages between the same layers of two different Bluetooth systems being clearly regulated (connecting arrows 120, 122, 124, 126 in FIG. 1A).

FIG. 2A shows an ad-hoc communication radio module 202 based on an exemplary embodiment of the invention which has an ad-hoc communication reception circuit 204 and/or an ad-hoc communication transmission circuit 206 and an ad-hoc communication-protocol-stack-external control interface 212 for the ad-hoc communication-protocol-stack-external control of the ad-hoc communication reception circuit 204 or of the ad-hoc communication transmission circuit 206.

In line with various exemplary embodiments of the invention, control is also understood in the further sense to mean the transmission of information or messages, for example, which are necessary or might be necessary for controlling the ad-hoc communication reception circuit or the ad-hoc communication transmission circuit, for example, such as information about the properties and identification features of said circuits. This is explained in more detail in the further course of this description.

In addition, "communication-protocol-stack-external interface" is understood, by way of example, to mean that the interface forms an access from a point outside the communication protocol of the ad-hoc communication system to a point inside the communication protocol, or vice versa, this also including the devices covered by the communication protocol.

In this context, the interface is an interface which is not part of the communication protocol, for example. Alternatively, it may also be part of the communication protocol or integrated in the communication protocol, however.

From a hardware point of view, the protocol-external control may involve, by way of example, more or less integrated subsystems or circuits or devices within a communication appliance or else subsystems or circuits or devices situated in another communication appliance, for example an intelligent map.

The access can address functions and information in the communication protocol, specifically from a higher level which contains the access, for example, on the basis of the communication protocol down to the physical level. In this context, the higher level chosen may be a level on which the internal interfaces for controlling functions and services are also implemented, such as the level which is situated beneath the application level. In a Bluetooth system, this would be the Logical Link Control and Adaptation (L2CAP) level, for example.

In line with one exemplary embodiment, the ad-hoc communication-protocol-stack-external control interface 212 of the ad-hoc communication radio module 202 has at least one ad-hoc communication-protocol-stack-external service access point 214.

Hence, the services on the relevant layer can be used externally within the communication protocol, and information and control instructions can be interchanged using defined service primitives, for example, in a similar manner to that for the relevant internal service access points. This provides the compliance with the conventional system and allows simple extension.

A service access point (SAP) is the interface for interaction with a communication layer, for example at the upper boundary of the same layer. Traditionally, communication systems and communication protocols are modeled in telecommunication using what are known as layer models, such as the ISO/OSI 7-layer model described above. Functions which are needed for communication are modeled and presented in layers situated above one another. Each layer performs a specific task (for example data coding/data decoding). In other words, each layer provides a certain service for the overall system, which is used by the next highest layer. An interface which a layer provides upwards for its service is a service access point (SAP). Details in this regard are shown in FIG. 1B.

The higher layer, e.g. the (N+1) layer 152, which is higher than the N layer 154 and which is formed by the N instances 164, 166, is what is known as the service user, which accesses the service of the lower layer, e.g. 154 (the service provider), only via the service access point (SAP), e.g. 158, 160, 162. The layers such as layer 154 are formed by instances, such as the N instances 164, 166 in FIG. 1B, in which the relevant protocol is implemented, such as the N protocol for the N instances 164, 166. For communication, this involves the use of what are known as service elements (primitives) which the higher layer, e.g. layer 152, uses to send requests to the lower layer, e.g. layer 154, or to receive data from this layer 154, for example.

It is entirely possible for a layer to provide a plurality of identical or different services simultaneously—for example when a plurality of connections are being handled simultaneously. This means that a layer, such as layer 154, can have a plurality of service access points 158, 160, 162. In many protocols, it is then customary for these service access points 158, 160, 162 to be denoted by numbering, a name or the like in order to distinguish them. Such a descriptor is called the service access point identifier (SAPI). Higher layers then address a service using an appropriate SAPI, for example in order to ensure that the request can be associated with the connection for which it is intended.

The Bluetooth SIG (Special Interest Group) committee tasked with standardizing Bluetooth technology decided, in early 2006, to incorporate not only the tried and tested physical transmission layer 102, which provides net data rates of up to 2.2 Mbit/s (in a download based on Bluetooth Version 2.0+enhanced data rate, the gross data rate is approximately 3 Mbit/s), but additionally an (or a plurality of) alternative "controller(s)", which are meant to provide significantly higher net data rates of above 100 Mbit/s, into the existing Bluetooth architecture. As shown in FIG. 3, the transmission/reception modules 350, 360, 370 in other radio technologies which need to be integrated within the Bluetooth SIG are referred to as AMPs (Alternate MAC/PHY) and include at least a physical layer (layer 1, PHY) 352, 362, 372 and an associated data link layer 354, 364, 374 (layer 2; MAC). A PAL (Protocol Adaptation Layer) 356, 366, 376 is possibly also included which is resident above the MAC layer 354, 364, 374 and which is intended to make it easier to "dock" the alternative "controller" 350, 360, 370 onto the host 300. First of all, the OFDM (Orthogonal Frequency Division Multiplexing) based UWB (ultra wideband) solution based on the standards ECMA-368 and ECMA-369 of the WiMedia Alliance needs to be integrated into the existing Bluetooth architecture. Known examples of OFDM technology are: Digital Video Broadcasting (DVB), Digital Audio Broadcasting (DAB), x Digital Subscriber Line (xDSL) and Power Line Communications (PLC). Later, it is also possible for further radio technologies to be added. WLAN (Wireless Local Area Network) based on IEEE 802.11b/g has the greatest chance, in this context, of being integrated into the existing Bluetooth architecture as the next radio technology. The Bluetooth SIG has already founded a separate study group for this purpose.

A central element currently being discussed in the Bluetooth system architecture of the next generation of Bluetooth is currently what is known as an "AMP manager" 330, as shown in FIG. 3. By way of example, this is intended to take control of which of the different transmission/reception modules 340, 350, 360, 370 are switched on or switched off at what time or upon the occurrence of what events.

At today's level of discussions, the future intention is for it to be possible to select from at least
  the legacy Bluetooth controller 340
  AMP1 350 based on UWB technology (according to the WiMedia Alliance), and
  AMP2 360 based on WLAN technology (according to IEEE 802.11b/g).
The AMP manager 330 can be regarded as a logical functional unit. By way of example, it may be implemented in the session layer 324 (besides the L2CAP resource manager 326 and the channel manager 328), where it provides the higher protocol layers with the following services via a dedicated AMP manager SAP 320:
  discovering AMP managers on the opposing side (i.e. in adjacent appliances to which a connection has been or can be set up),
  discovering supported AMP technologies on the opposing side,
  obtaining detailed information (e.g. supported parameters) about particular AMP technologies on the opposing side,
  obtaining detailed information (e.g. supported parameters) about AMP technologies used in the individual appliance,
  setting up a physical AMP link,
  managing a physical AMP link,
  clearing down a physical AMP link.

By way of example, provision is made for the L2CAP layer 324 (session layer or Bluetooth core layer as shown in FIG. 3) also to be altered for the integration of further transmission/reception modules (AMPs) 350, 360, 370 so that logical channels can be multiplexed using different transmission/reception modules 340, 350, 360, 370. At present, the introduction of a "multiradio selection and routing module" 334 in the session layer 324 is being discussed.

To be able to provide the higher layers in the overall system with the services from the new functional units in the Bluetooth core layer (L2CAP layer) 324, provision is made, by way of example, for the existing L2CAP SAP 316 to be extended or for a dedicated L2CAP AMP SAP 318 to be added. Using these two possible SAPs 316, 318, the extended L2CAP layer 324 is capable of providing the following services:
  setting up a logical L2CAP data channel via a selected existing physical AMP connection,
  transferring an existing logical L2CAP data channel from a first active AMP connection to another active AMP connection,
  transferring an existing logical L2CAP data channel from an active AMP connection to the established Bluetooth connection ("Legacy Bluetooth Controller" 340 at 2.4 GHz), or vice versa.

In the further course of the AMP integration efforts, it is entirely conceivable that the scope of the functions of the L2CAP layer 324 will grow still further in future and consequently still further new SAPs will be defined (it is conceivable for there to be a dedicated ranging SAP 322, for example, for performing distance measurements, etc.), or that some of the aforementioned dedicated SAPs will be pooled.

When reference is made to the new external service access point SAPext in the further course of the description of the exemplary embodiments of the invention, this is also intended to be able to include a plurality of the aforementioned service access points, for example, such as the "AMP manager SAP" 320, the "L2CAP AMP SAP" 318, the "ranging SAP" 322, etc.

FIG. 3 shows a general block diagram of the planned integration of alternative transmission/reception modules (AMPs) 350, 360, 370 for the next generation of Bluetooth. Each AMP 350, 360, 370 includes a PHY layer 352, 362, 372 and MAC layer 354, 364, 374. The equally shown PAL (Protocol Adaptation Layer) 356, 366, 376 is used for better adaptation of the individual interfaces of the different transmission/reception modules to suit the properties demanded by the host system (HCI interface 336) and is optional. The conventional Bluetooth 2.4 GHz controller "Legacy Bluetooth Controller" 340 in FIG. 3) does not require a PAL, since the HCI interface 336 is tailored to this controller in optimum fashion. Above the HCI interface 336, the L2CAP (logical link control and adaptation layer) layer 324 is shown. Conventionally, this includes a resource manager 326 and a channel manager 328. The introduction of an AMP manager 330 is currently under discussion within the context of the incorporation of UWB based on ECMA-368 and ECMA-369 and the incorporation of WLAN based on 802.11 b/g. The L2CAP layer 324 provides the application/ profile management entity 308 with various services via the SAPs 310, 312., 314, 316, 318, 320, 322 shown. The first four SAPs (Synch SAP 310, Control SAP 312, SDP SAP 314 and L2CAP SAP 316) are described in detail in Bluetooth Specification Version 2.0.

The architecture blocks in FIG. 3 which are being discussed within the framework of AMP extensions are the AMP manager 320 and the multiradio selection and routing module 334. Future function extensions mean that further logical functional units may also appear in the L2CAP layer 324. At the upper end of the L2CAP layer 324, the SAPs discussed today are shown:

L2CAP AMP SAP 318,
AMP Manager SAP 320, and
Ranging SAP 322.a10

Linking the individual AMPs 350, 360, 370 to the host system may require adaptations both in the respective transmission/reception module 350, 360, 370 and in the host system. It may thus be that the PAL blocks shown in FIG. 3 will be split, specifically into an L-PAL (L for "lower") in the individual transmission/reception modules 350, 360, 370 and a U-PAL (U for "upper") in the L2CAP layer 324. This is not shown in FIG. 3 but should not be left unmentioned here for the sake of completeness. In the further course of this description, the starting point is a system architecture as shown in FIG. 3, i.e. consideration is given only to the variant in which all PAL functionalities are implemented in the individual transmission/reception modules 340, 350, 360, 370 (Bluetooth terminology: "controllers"). Transmission to the other architecture variant with split PAL functionality is trivial and is not treated separately in this description, but is likewise provided in an alternative exemplary embodiment of the invention.

In one exemplary embodiment of the invention, FIG. 2B shows an ad-hoc communication-protocol-stack-external control interface 212 of the ad-hoc communication radio module 202, said control interface having a plurality of ad-hoc communication-protocol-stack-external service access points 214, 216, 218.

The implementation of a plurality of external service access points allows a plurality of communication-protocol-stack-external applications 220, 222, 224 to control the transmission and/or reception modules 204, 206 simultaneously and from their point of view independently of one another, as shown in FIG. 2B, for example. In this context, control is again also intended to be understood to mean the bidirectional interchange of information between external applications 220, 222, 224 and the transmission and/or reception modules 204, 206, for example. The control is self-evidently not effected directly but rather is effected indirectly with intermediate instances according to the rules of the communication protocol.

In one exemplary embodiment of the invention, the ad-hoc communication radio module 202 is set up on the basis of Bluetooth or ZigBee.

The Bluetooth protocol has already been described in detail further above for the exemplary embodiments of the invention. ZigBee is a further ad-hoc radio standard for shorthaul links up to approximately 10-100 m, the protocol stack of which is explained briefly below.

As shown in FIG. 4, ZigBee has a physical level PHY 402 and a medium access level MAC 404 based on the OSI model, which are based on the IEEE 802.15.14 standard. The PHY and MAC layer functions are also determined by the hardware (ZigBee/IEEE 802.15.4 controller) in addition to IEEE 802.15.4.

Above the MAC level 404, there is a network layer (NWK) 406 which adapts the PHY and MAC layer functions to suit the higher layers of the ZigBee stack.

The service access points are denoted according to their layer: APSDE (Application Support Sublayer Data Entity) SAP 416, 418, 420, APSME (Application Support Sublayer Management Entity) SAP 422, NLDE (Network Layer Data Entity) SAP 424, NLME (Network Layer Management Entity) SAP 426, MLDE (MAC Layer Data Entity) SAP 428, MLME (MAC Layer Management Entity) SAP 430, PD (Physical Device) SAP 432 and PLME (Physical Layer Management Entity) SAP 434.

The application support sublayer (APS) 408 situated above the MAC level defines the logical appliance type (device type) in the network, multiplexes the incoming data and is responsible for security mechanisms. It provides an interface through the APSDE and the APSME. The APSDE provides the data transmission service for the PDUs (Packet Data Units, Protocol data units) between two or more appliances in the same network. The APSME provides services for discovering and connecting new appliances and runs a database with managed objects.

The ZDO (ZigBee Device Object) 436 is responsible for initializing the APS, the NWK and the Security Services Specification (SSS). The ZDO 436 compiles the configuration information from the end applications in order to determine and implement the discovery of devices, the security management, the network management and the connection management.

Above the APS 408, there is the application framework 410, the APS 408 being connected to the applications 412, 414 via the APSDE (Application Support Sublayer Device Entity) SAPs 416, 418. In the ZigBee application framework 410, the application objects 412, 414 are stored on a ZigBee device. Within the application framework 410, the application objects 412, 414 send and receive data via the APSDE SAPs 416, 418.

In line with the description concerning Bluetooth, ZigBee would allow transmission and reception modules on which the PHY and the MAC are implemented to be controlled via communication protocol external interfaces. By way of example, the external service access points could be based on the APS.

Figure 5A:
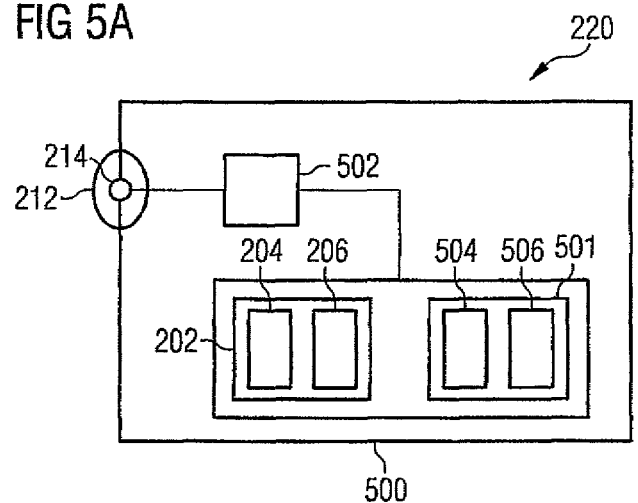

As shown in FIG. 5A, an ad-hoc communication radio module arrangement 500 based on an exemplary embodiment has, in addition to the radio module 202, at least one further radio module 510 with an additional reception circuit 506 and/or with at least one additional transmission circuit 504 and has a controller 502 for controlling the ad-hoc communication reception circuit 206 or the ad-hoc communication transmission circuit 204 and also the additional reception circuit 506 or the additional transmission circuit 504, the controller 502 having an ad-hoc communication-protocol-stack-external control interface 212.

By way of example, the controller 502 could be the logical AMP control unit discussed above, the AMP manager 330.

In line with one exemplary embodiment, the at least one additional reception circuit 506 of the ad-hoc communication radio module 202 and/or the at least one additional transmission circuit 504 is/are set up on the basis of a different radio technology than the ad-hoc communication reception circuit 206 or the ad-hoc communication transmission circuit 204.

That is to say that the Bluetooth appliance or the ZigBee appliance may also have further transmission/reception circuits which differ from the actual Bluetooth or ZigBee radio technology. Physically, these outside devices may be located in the same appliance; alternatively, they may be located in another appliance.

Figure 5B:
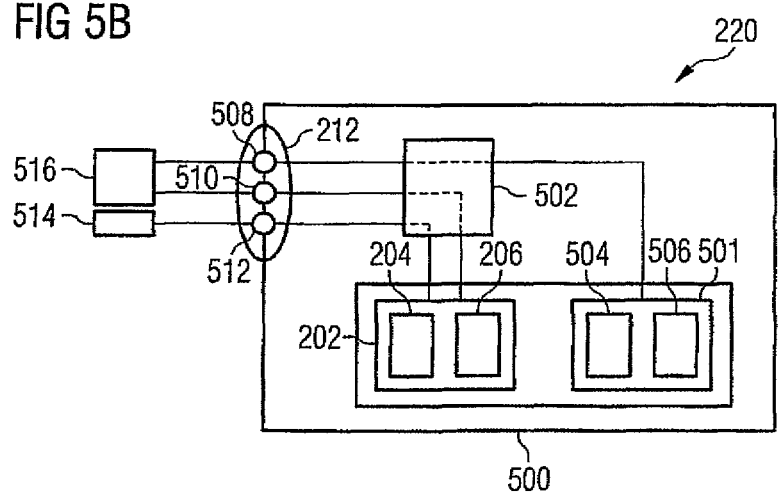

If there are a plurality of external service access points present then a plurality of communication-protocol-stack-external applications can control the transmission and/or reception circuits simultaneously and from their point of view independently of one another, as shown in FIG. 5B, for example, via the service access points 510 or 512 and the service access point 508.

Alternatively, it is also possible for an external application 520 to control a plurality of radio modules 202, 501, 526 and hence a plurality of transmission and/or reception circuits 204, 206, 504, 506, 522, 524 simultaneously and from their point of view independently of one another via the service access points 508, 510, 512, as shown in the example in FIG. 5C.

FIG. 5D shows an example in which a respective application 540, 542, 544 controls precisely one transmission and/or reception circuit 204, 206, 504, 506 and 522, 524.

A combination of these is also possible, as can likewise be seen in FIG. 5B, for example, where the application 514 additionally uses the service access point 512 to control the transmission circuit 204 and the reception circuit 206.

In this case too, the control is effected not directly but rather in accordance with the rules of the communication protocol, which means that an orderly flow of data takes place, for example by means of appropriate multiplexing and routing, and which means that two transmission circuits do not send simultaneously, for example, when this is meant to be generally impossible, for example.

In line with one exemplary embodiment, the at least one additional reception circuit 506 and/or the at least one additional transmission circuit 504 of the ad-hoc communication radio module 202 is set up on the basis of one of the following radio technologies: ultra wideband radio technology (e.g. based on the WiMedia Alliance); wireless local area network radio technology (e.g. based on IEEE 802.11b/g). The latter is also known by the term WLAN.

Other ad-hoc radio technologies—not cited here—are also suitable in alternative exemplary embodiments of the invention, however; by way of example, radio technologies which have a design based on or similar to the OSI model, i.e. have a physical layer PHY and a MAC layer, are suitable for this purpose.

It should be noted that the figures show only the parts which are helpful in illustrating the exemplary embodiments of the invention.

Figure 5E:
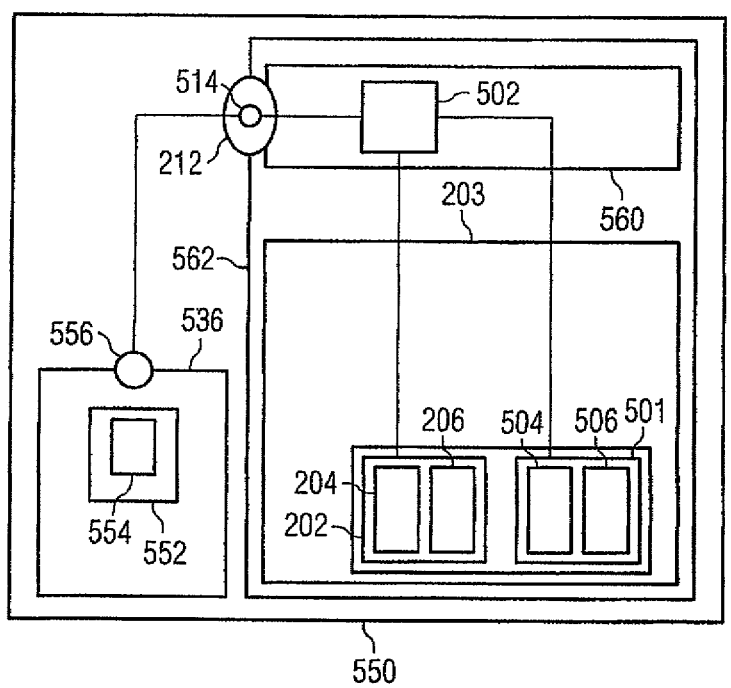

In one exemplary embodiment of the invention, FIG. 5E shows an ad-hoc communication device 550 which includes a first ad-hoc communication radio module 202, having an ad-hoc communication reception circuit 206 and/or an ad-hoc communication transmission circuit 204, and a second ad-hoc communication radio module 501, which likewise has an ad-hoc communication reception circuit 506 and/or an ad-hoc communication transmission circuit 504, and includes an ad-hoc communication-protocol-stack-external control interface 212 for the ad-hoc communication-protocol-stack-external control of the ad-hoc communication reception circuits 206 and 506 or the ad-hoc communication-protocol-stack-external control of the ad-hoc communication transmission circuits 204 and 504, and also includes a memory 552 for storing a control program 554 for the ad-hoc communication-protocol-stack-external control of the ad-hoc communication reception circuits 206 and 506 or ad-hoc communication transmission circuits 204 and 504 of the two ad-hoc communication radio modules 202 and 501.

By way of example, the control program 554 accesses the interfaces 556 and 212 and is thereby able to address the controller 502, which for its part takes the messages sent by the control program 554 as a basis for controlling the transmission and reception modules 204, 206, 504 and 506.

In the case of Bluetooth, the ad-hoc radio module 202 shown in FIG. 5E could be in the form of a conventional Bluetooth controller, for example, and 560 could represent the Bluetooth host. In one exemplary embodiment, the ad hoc module 501 could be in the form of a WLAN or UWB module.

Different communication radio modules can also be combined in one functional unit, and could even be implemented on the same chip (substrate). This possibility is indicated by the box 203. In addition, it is conceivable for one (or both) of the radio modules 202 and 501 (or the functional unit 203) to be functionally integrated into the Bluetooth host 560.

In line with one exemplary embodiment, the control program 554 is a control program which the ad-hoc communication radio module 202 considers trustworthy.

The trustworthiness can be ensured by virtue of an activated Trusted Platform Module (TPM), for example.

The Trusted Platform Module (TPM) is a chip which, as part of the TCG (Trusted Computing Group) specification, was originally intended to make PCs more secure. It is based on a permanently installed smartcard with the important difference that it is not tied to one specific user, but rather is tied to a system. In addition to the use in PCs, it is intended to be integrated into PDAs, mobile telephones and, more recently, also into consumer electronics appliances. The TPM chip is passive and can directly influence neither the boot process nor operation. It contains an explicit identifier and is therefore used for identifying the computer. Furthermore, within the TPM, a multiplicity of different digital keys can be produced, used and securely stored. One effect is that these keys never need to be left by the TPM. This means that they are protected against software attacks. There is likewise a relatively high level of protection against hardware attacks (security is comparable to smartcards). Also, the TPMs are manufactured such that physical manipulation results in inevitable destruction of the data. The most important functionality for this invention is TPM-supported certification. This allows a remote party to be convinced that the trusted computing platform has particular capabilities and is a well defined state, in other words is trustworthy. In some cases, an activated TPM is a prerequisite for the execution of particular applications.

In line with one exemplary embodiment of the invention, the ad-hoc communication device 550 also has a mobile radio communication reception circuit 504 and/or a mobile radio communication transmission circuit 506.

It is therefore possible to use a Bluetooth appliance, for example, to set up mobile radio voice and data links which can be controlled via the external interface 212. One example of application would be changing a current connection via a Bluetooth transmission/reception circuit, e.g. 204, 206, to a mobile radio link when the Bluetooth appliance leaves the range of the Bluetooth link, for example. An application can request the properties of the mobile radio transmission/reception circuits, e.g. 504, 506, and prompt the change of connection.

In line with one exemplary embodiment, the mobile radio communication reception circuit or the mobile radio communication transmission circuit of the ad-hoc communication device 550 is set up on the basis of a second-generation mobile radio technology or on the basis of third-generation mobile radio technology.

In one exemplary embodiment, the mobile radio communication reception circuit or the mobile radio communication transmission circuit of the ad-hoc communication device 550 is set up on the basis of one of the following mobile radio technologies: Global System for Mobile Communications mobile radio technology (GSM), Universal Mobile Telecommunication System mobile radio technology (UMTS), Code Division Multiple Access mobile radio technology (CDMA), Code Division Multiple Access 2000 mobile radio technology (CDMA2000), Freedom of Mobile Multimedia Access mobile radio technology (FOMA).

In addition, however, existing or future mobile radio technologies which are not cited here are also suitable, such as satellite mobile radio systems.

Furthermore, the ad-hoc communication device 550 also has, on the basis of one exemplary embodiment, a cordless communication reception circuit and/or a cordless communication transmission circuit.

Since the ISO/OSI layer model is sometimes also widely referred to as wireless telephony in the field of cordless communication, such as cordless telephony, and cordless data transmission is in widespread use, cordless communication reception circuits and cordless communication transmission circuits which are based on this model are also particularly suitable, for example.

In line with one exemplary embodiment, the cordless communication reception circuit or the cordless communication transmission circuit of the ad-hoc communication device is set up on the basis of one of the following mobile radio technologies: Digital Enhanced Cordless Telecommunication cordless technology, Wideband Digital Enhanced Cordless Telecommunication cordless technology, Cordless Telephony 2 cordless technology, Cordless Advanced Technology—Internet and quality cordless technology.

It is therefore also possible for the widest variety of combinations of different cordless communication devices and different mobile radio communication devices and also further communication devices with a similar protocol stack to be formed in the lower layers in accordance with alternative exemplary embodiments of the invention.

In addition, for example, a configuration in which a Bluetooth appliance has a ZigBee radio module, or vice versa, is also conceivable.

FIG. 5E also shows an exemplary embodiment of the invention in which the ad-hoc communication device 550 also has a user identification element interface 556 for communication with a user identification element 536 of a user of the ad-hoc communication device 550.

It is significant in this context that at least part of the identification element interface 556 is either identical to the ad-hoc communication-protocol-stack-external control interface 212 or the interface 556 is adapted to suit the interface 212, so that the communication with the communication radio module 202 can take place via these interfaces 556, 212 and finally this also means that control of the communication reception and/or transmission circuits (possibly with the involvement of the control unit 502) is achieved.

In line with one exemplary embodiment, the ad-hoc communication device 550 also has a user identification element 536 which is coupled to the user identification element interface 556 for the purpose of communication.

The user identification element 536 can be seen from FIG. 5E and is coupled to the unit 562 via the user identification element interface 556.

In line with one exemplary embodiment of the invention of the ad-hoc communication device 550, the control program 554 is stored in a memory 554 in the user identification element 536.

As explained in more detail further below, the memory used for the control program is an EEPROM (Electrically Erasable Read. Only Memory), for example. For data-rich applications, the memory 554 may alternatively be a flash memory, for example, or, in the case of an EEPROM, may be extended with a flash memory. However, the memory type is generally not limited to the cited memory types.

In line with one exemplary embodiment, the user identification element 536 of the ad-hoc communication device 550 is a subscriber identification module.

By way of example, the identification element 536 is a SIM card, a SIM toolkit card, a UICC card with one or more applications, such as SIM applications or USIM applications, or another smartcard. The applications on the smartcards may be implemented as Java applets, for example.

For operating in the mobile radio network, mobile radio terminals based on the GSM standard require a SIM card, and mobile radio terminals based on the UMTS standard require a UICC (Universal Integrated Circuit Card), on which the presence of at least one USIM (Universal Subscriber Identity Module) is required. Both SIM cards and UICCs may have applications installed on them. Many of these applications are usually mobile-radio-specific and are provided and controlled (including subsequently updated) exclusively by the network operator.

Trustworthy applications for executing particular functions, as are of importance to this invention, may likewise be stored on such intelligent mobile radio chip cards.

Figure 6:
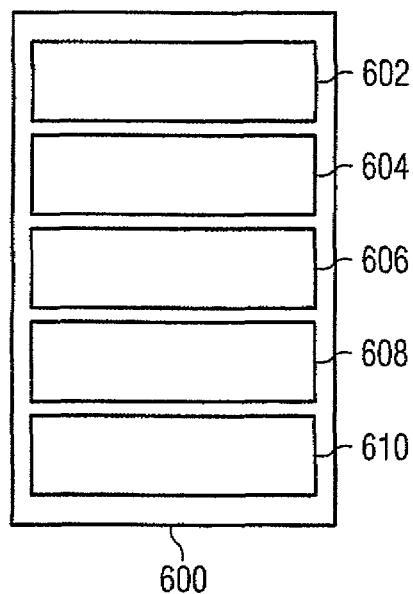
FIG. 6 shows architecture blocks for a smartcard using the example of a UICC based on an exemplary embodiment of the invention.

FIG. 6 provides simplified description of five architecture blocks for a smartcard 600 using the example of a UICC having:

an application memory 602, e.g. an EEPROM (Electrically Erasable Programmable Read Only Memory). The application memory 602 contains applications, USAT (USIM Application Toolkit) applets, and data, such as (SMS Short Message Service), MMS (Multimedia Messaging Service), telephone book, etc.;

a read only memory (ROM) 604 which contains the USAT, Smart Card Applications, the file system, algorithms, Java VM (virtual machine) and operating systems;

a multiple access memory (RAM, Random Access Memory) 606 which is the main memory and stores computation results or data for the input/output communication;

a microprocessor unit MPU 608 which executes commands; and an input/output controller (I/O controller) 610, the task of which is to manage the flow of data between the mobile radio terminal and the microprocessor unit MPU.

In a mobile radio system based on the GSM standard, the SIM card and the mobile equipment ME (mobile radio terminal) together form a mobile station (MS). In a mobile radio system based on the UMTS standard, on the other hand, the UICC (the ROM of which may contain a plurality of SIMs and USIM) and the mobile equipment ME (mobile radio terminal) together form what is known as the user equipment UE (3GPP terminology, user terminal).

When an intelligent mobile radio chip card, such as a SIM card or a UICC, is connected to a piece of mobile equipment ME (mobile radio terminal), for example by virtue of the card being plugged into the appliance, the applications (such as SIM, USIM, ISIM, etc.) on the intelligent mobile radio chip card can interchange a large amount of information with the mobile radio terminal. Firstly, the mobile radio terminal can send commands to the intelligent mobile radio chip card, or the intelligent mobile radio chip card can notify the mobile radio terminal of the occurrence of previously defined events. The generic command set defined for this purpose is called CAT (Card Application Toolkit). This refers quite generally to NAAs (Network Access Applications) which may be installed on intelligent chip cards—as are used in mobile radio. In the case of mobile radio terminals which are set up on the basis of the 2G standard GSM, the NAA is a SIM, and in the case of mobile radio terminals which are set up on the basis of the 3G standard UMTS, the NAA is a USIM. The SIM- and USIM-specific CAT extensions are referred to as SAT (SIM Application Toolkit) and USAT (USIM Application Toolkit), respectively.

Both SAT for 2G mobile radio and USAT for 3G mobile radio are standardized in 3GPP. The terms CAT, SAT and USAT usually include not only a set of commands which can be interchanged between an intelligent mobile radio chip card and a mobile radio terminal via the interface but also the obligatory procedures appropriate to a particular command set on the applications on the card (such as SIM, USIM, etc.), and the appropriate obligatory functionalities on the mobile equipment ME (mobile radio terminal).

Usually, a mobile radio terminal notifies a SIM or USIM located on an intelligent mobile radio chip card of the optional SIM- or USIM-specific functionalities which it currently supports immediately after the connection of the mobile radio terminal for the profile download. As a good example, this tells the SIM or USIM on the card "what the mobile radio terminal can do" (initiative comes from the mobile radio terminal). By way of example, this has the effect that the SIM or USIM can adapt its range of functions to suit the mobile radio terminal in optimum fashion, for example by restricting the scope of the SAT or USAT command set or extending its command set by commands which are optional but which are supported by the mobile radio terminal.

Information interchange is also possible in the other direction: applications on an intelligent chip card, for example a USIM, can also indicate to a mobile radio terminal that they would like to send data to the mobile radio terminal (if both parties support what is known as UICC proactive command functionality). From a technical point of view, the mobile radio terminal fetches the data from the chip card by means of a "Fetch" command in response to such an indication.

The USIM first of all undergoes an initialization process. Part of this process is a check on the services which are generally supported by the USIM (USIM service table request) or on the services which are currently enabled by the USIM (USIM Enabled Services Table Request) by the mobile radio terminal. A USIM service which is flagged in these service tables as unavailable or as not enabled cannot be selected or addressed by the mobile radio terminal.

One exemplary embodiment of the invention furthermore includes a method which can be used to control communication modules in an ad-hoc communication appliance.

Figure 7:
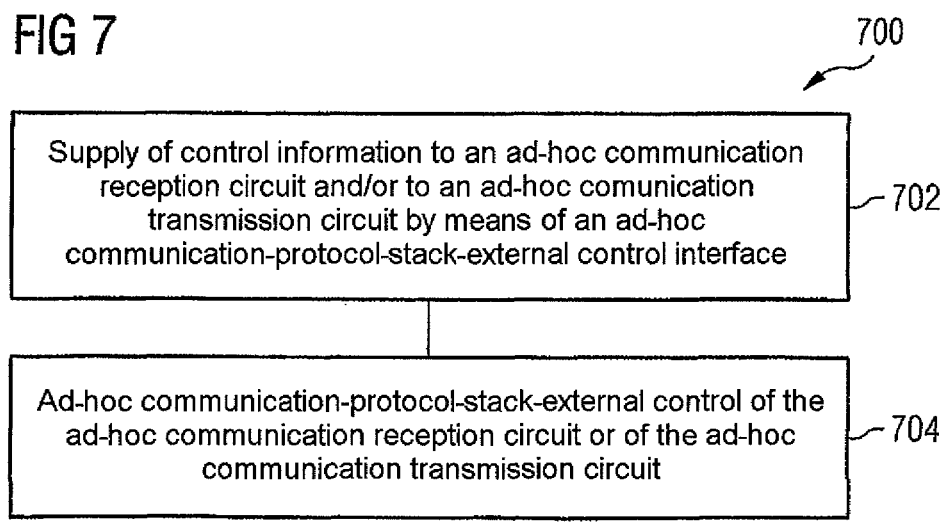
FIG. 7 shows a method for the external control of an ad-hoc communication radio module based on an exemplary embodiment of the invention.

FIG. 7 shows, in conjunction with FIG. 2A, a method 700 based on an exemplary embodiment of the invention for controlling an ad-hoc communication radio module 202, in which, in 702, control information for an ad-hoc communication reception circuit 202 and/or for an ad-hoc communication transmission circuit, such as 204, is supplied by means of an ad-hoc communication-protocol-stack-external control interface 212 in order to control the ad-hoc communication reception circuit 206 or ad-hoc communication transmission circuit 204 on an ad-hoc communication-protocol-stack-external basis in accordance with 704.

In contrast to conventional methods, the method thus allows ad-hoc communication reception circuits and ad-hoc communication transmission circuits, for example, to be controlled by applications outside of the ad-hoc communication protocol. This relates not only to the radio communication module of the ad-hoc communication protocol, such as Bluetooth, but rather also to communication modules of other protocols, as explained in the following exemplary embodiments. In this context, the interface forms the access from and to the communication modules.

Since the control externally involves an application, for example, access is effected via an interface to a layer beneath the application layer of the communication protocol, such as the L2CAP 324 in the case of Bluetooth, using the services of this next lowest protocol layer. In the case of ad-hoc communication protocols, this use is effected, as already described above, using service access points.

Therefore, the ad-hoc communication-protocol-stack-external control interface of the method 700 based on one exemplary embodiment has at least one ad-hoc communication-protocol-stack-external service access point.

Such an access point has already been explained with reference to FIG. 1, for example, and illustrated in one exemplary embodiment of the invention by means of FIG. 2A, in which an application uses the service access point 214 of the interface 212 to control the transmission circuit 204 or the reception circuit 206.

In line with one exemplary embodiment, the ad-hoc communication-protocol-stack-external control interface 212 of the method 700 has a plurality of ad-hoc communication-protocol-stack-external service access points.

Examples of a control interface having a plurality of service access points have already been presented further above with reference to FIGS. 5A, 5B, 5C, 5D and 5E, in which one or more applications in various combinations control one or more transmission and/or reception circuits. The examples shown in these figures and comments relating to said examples can also be transferred to the subsequent exemplary embodiments of the method 700.

In line with one exemplary embodiment, the ad-hoc communication radio module 202 of the method 700 is set up on the basis of Bluetooth or ZigBee.

In line with a further exemplary embodiment, the control information of the method 700 is supplied to a controller 502, wherein the controller 502 controls the ad-hoc communication reception circuit 206 and/or the ad-hoc communication transmission circuit 204 and/or an additional reception circuit 506 and/or an additional transmission circuit 504.

In line with one exemplary embodiment of the method, the at least one additional reception circuit 506 and/or the at least one additional transmission circuit 504 of the method is set up on the basis of a different radio technology than the ad-hoc communication reception circuit 206 or the ad-hoc communication transmission circuit 204.

In line with one exemplary embodiment, the at least one additional reception circuit 506 and/or the at least one additional transmission circuit 504 of the method is set up on the basis of an ultra wideband radio technology (e.g. based on the standards ECMA-368 and ECMA-369 from the WiMedia Alliance) or a wireless local area network radio technology (e.g. based on IEEE 802.11b/g).

Detailed exemplary embodiments of the invention are explained below.

FIG. 8A shows an exemplary overview of function blocks in a first overall system (appliance D) 800, having a first application AP1 802, which is in the area of influence of a TPM 806 and can therefore be classified as trustworthy, a Bluetooth host subsystem 810 which includes an AMP manager 814, and a plurality of Bluetooth controller subsystems C11 816 to Cln 818. The area of influence of the TPM 806 is shown in simplified form by the dashed box ("trusted computing platform") 808. Similarly the area of influence of the TPM 806 contains a functional unit for the position-finding 804 of the appliance D 800, which might be a GPS module ("Location Module"), for example.

All the function blocks in the area of influence 808 of the TPM (TCP 806) communicate with one another via the interfaces Iint 822, 820 in this simplified illustration. The first application AP1 802 communicates with the AMP manager 814 in the Bluetooth host subsystem 810 via the interface I2 824. The new service access point SAPext 830 for external access to the Bluetooth system is shown in FIG. 8A as a dedicated service access point SAPext 830 in the Bluetooth core layer (L2CAP layer 324 from FIG. 3) and is therefore on the same level as the AMP manager SAP 320 from FIG. 3, for example.

FIG. 8B shows an exemplary overview of function blocks in a second overall system ME 840, having a UICC 850, which in this case is representative of an intelligent mobile radio chip card, with a trustworthy first application AP1 848, having a mobile radio terminal 854, which is set up on the basis of the mobile radio standard UMTS, for example, with a second application AP2 844, having a Bluetooth host subsystem 810, which includes an AMP manager 814, and having a plurality of Bluetooth controller subsystems Cl1 816 to Cln 818. In addition, the UICC 850 also includes a functional unit 852 for the position-finding of the mobile radio terminal (ME) 854, which could be a GPS module ("Location Module"), for example. The first application AP1 848 communicates with the second application AP2 844 by a first interface I1 846. If the terms CAT, SAT and USAT are again understood as already explained above, they include not only the messages interchanged by the interface I1 846 but also the obligatory procedures matching a particular command set, both on the part of the first application AP1 848 (i.e. on the intelligent mobile radio chip card) and on the part of the second application AP2 844 (i.e. in the mobile radio terminal ME 854).

For this reason, the USAT (dashed box) 842 shown in FIG. 8B also includes the two applications AP1 848 and AP2 844 in which the functionalities associated with the command set are implemented. The mobile radio terminal (ME) 854 communicates with the AMP manager 814 via a second interface I2 824. For this purpose, the Bluetooth core layer (L2CAP layer) has a dedicated service access point SAPext 830 which opens the conventional closed Bluetooth system based on an exemplary embodiment of the invention outwards for the purpose of influencing by a first trustworthy application AP1 848 and/or a second (sometimes likewise trustworthy) application AP2 844. In this way, commands or messages which the mobile radio terminal (ME) 854 has received from an intelligent mobile radio chip card in a first phase via a CAT/SAT/USAT can be transferred from the mobile radio terminal (ME) 854 in a second phase to logical functional units within the Bluetooth host subsystem 810, such as the AMP manager 814 or other logical functional units yet to be defined in future, and in the opposite direction.

Of particular advantage is the definition of the external service access point SAPext 830 at the upper end of the L2CAP layer (Bluetooth core layer 324 from FIG. 3), as shown by FIG. 8A and FIG. 8B. As already explained above, in a future real system one service access point may also includes the other. In particular, the new SAPext 830 may include functions of the AMP manager SAP 320 or of the L2CAP AMP SAP 318 or of the ranging SAPs 322 fully or in part.

Figure 8C:
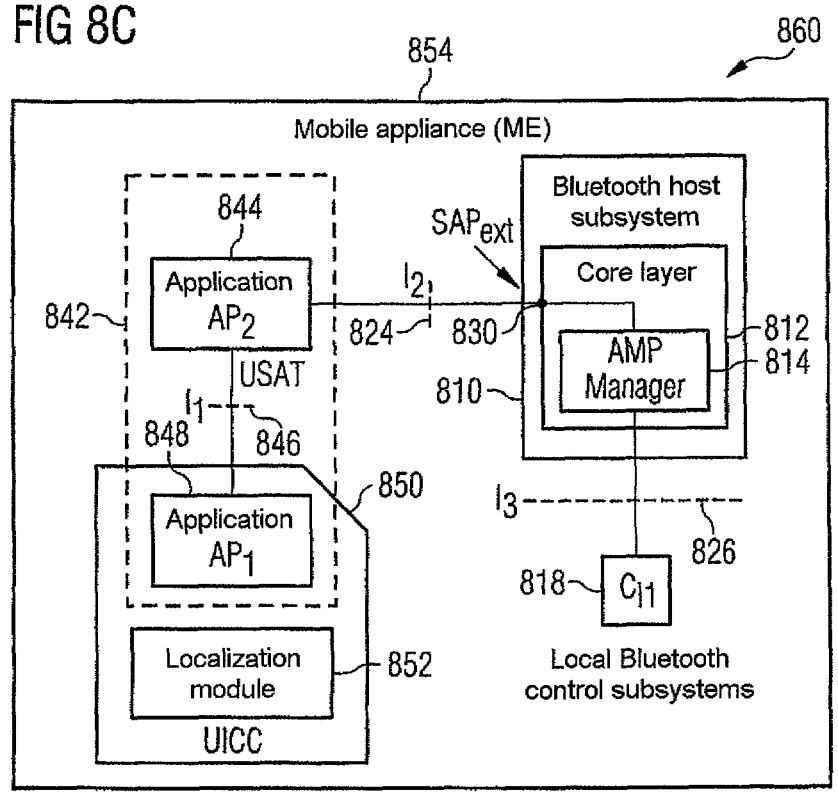

FIG. 8C shows an exemplary overview of function blocks in a third overall system ME 860, which, in contrast to the arrangement shown in FIG. 8B, has only one local Bluetooth controller subsystem 818. Hence, the service access point SAPext 830 is used, by way of example, to control a Bluetooth system, which, like the previous, conventional Bluetooth systems, contains only one radio transmission and/or reception module in the Bluetooth controller subsystem, of this radio transmission and/or reception module, in this case solely represented by the module 818, by means of the application AP1 848 or the application AP2 844 externally (possibly with involvement of the AMP manager 814).

In this example, the radio transmission and/or reception module 818 is a Bluetooth module, but a module from another protocol or standard would also be conceivable in an alternative exemplary embodiment of the invention.

In the examples above, the Bluetooth host subsystem 810 communicates with the individual Bluetooth controller subsystems 816, 818 via the interface I3 826, which is usually in the form of an HCI based on the Bluetooth specification. Implementations also exist in which one (or more) Bluetooth controller subsystem(s) is (are) merged relatively closely with the Bluetooth host subsystem 810. In these cases, the interface I3 826 does not appear externally.

In line with various exemplary embodiments of the invention, each transmission/reception module in a terminal (for example a mobile radio terminal) is intended to be provided with a 1-byte, locally individual identification feature, the byte with the value '0' specifying the legacy Bluetooth controller at 2.4 GHz. The identification feature does not usually reveal the type of transmission/reception module.

In accordance with FIG. 5A, FIG. 5B, FIG. 5C, FIG. 5D and FIG. 5E, it is possible to take the number of available service access points, applications and transmission and reception circuits as a basis for elaborating the widest variety of variants, which can very easily be derived from FIG. 5A, FIG. 5B, FIG. 5C, FIG. 5D and FIG. 5E and also FIG. 8A, FIG. 8B and FIG. 8C and the description thereof and are therefore not shown separately.

The subsequent message flowcharts 900, 1000, 1100, 1200 and 1300 describe the interchange of control commands and event messages on the basis of the exemplary overall system 840 shown in FIG. 8B, i.e. information which is relevant to Bluetooth is interchanged progressively via the two interfaces I1 846 and I2 824, with the data transfer via the first interface I1 846 being provided by CAT, SAT and USAT extensions. It may be necessary to adapt the information which is to be interchanged to suit the respective other interface. This task is performed by application AP2 844. Application AP2 844 may also be in the area of influence of a TCP 842. This is not shown in FIG. 8B in order to improve clarity.

Transfer of the message flowcharts 900, 1000, 1100, 1200 and 1300 shown below to the first exemplary overall system 800 shown in FIG. 8A, in which the control commands and event messages which are relevant to Bluetooth are merely interchanged by the interface I2 824, is trivial. For this reason, message flowcharts are not dealt with in detail at this juncture for FIG. 8A.

A) Message Flowchart 900: Discovering AMP Technologies

FIG. 9 shows the interchange of messages between the three main function blocks (application AP1 848, application AP2 844 and AMP manager 814) in the overall system 840 or 860 for the purpose of discovering transmission/reception modules Cl1 816 to Cln 818 which are currently connected to the local Bluetooth host subsystem 810 (i.e. currently locally available) (index '1' stands for 'local') or for the purpose of discovering transmission/reception modules Cb1 to Cbn which are currently available in adjacent appliances (index 'b' stands for 'adjacent'). By way of example, the transmission/reception modules Cb1 to Cbn currently available in adjacent appliances are discovered via the conventional Bluetooth controller at 2.4 GHz (local individual identification feature: byte with the value '0').

In 902, the application AP1 848, which is located on an intelligent mobile radio chip card, for example, sends a message of Discover_Available_AMPs type, which is intended to contain at least one of the pieces of information shown in table 2, for example, to the mobile radio 854 via the interface I1846. Table 3 shows the possible structure of a suitable Acknowledgement of Receipt_1.

From a technical point of view, the intelligent mobile radio chip card first of all indicates to the mobile radio terminal ME 854 that it wishes to send data to the mobile radio terminal 854. The latter then fetches the available data (as part of the "UICC proactive command" functionality) using a "Fetch" command. For the purpose of simplification, however, FIG. 9 shows only two messages: the first message (solid arrow) is used to send the Discover_Available_AMPs command to the mobile radio 854, and the second message (dashed arrow) can be used to send an Acknowledgement of Receipt_1 (optionally) from the mobile radio 854 to the intelligent mobile radio chip card 850 in order to acknowledge error-free reception of the command or in order to report an erroneous transmission (including error code).

TABLE 2

Possible information elements in the Discover_Available_AMPs message which are transferred from an application AP1 (mobile radio chip card) to an application AP2 (mobile radio terminal) via the CAT/SAT/USAT interface I1.

| Information element | Presence | Description |
|---|---|---|
| Message Type | Obligatory | Distinguishes this message as Discover_Available_AMPs. |
| Transaction feature | Obligatory | Application-inherent identifier for this transaction. |
| Version code number | Optional | Allows a protocol version number to be specified. |

TABLE 2-continued

Possible information elements in the Discover_Available_AMPs message which are transferred from an application AP1 (mobile radio chip card) to an application AP2 (mobile radio terminal) via the CAT/SAT/USAT interface I1.

| Information element | Presence | Description |
|---|---|---|
| SAPI | Obligatory | Identifies the service access point (SAP) in the Bluetooth core layer. |
| AMP manager ID | Obligatory | Identifies the AMP manager. |
| Sending instance ID | Obligatory | Identifies the requesting application on the chip card. |
| Bluetooth device address | Optional | Allows the BD-ADDR to be specified according to the Bluetooth specification. |
| Internal check | Optional | Switch on and switch off the discovery of currently locally available transmission/reception modules Cl1 to Cln. |
| External check | Optional | Switch on and switch off the discovery of currently available transmission/reception modules Cb1 to Cbn in adjacent appliances. |
| Result format | Optional | Allows the desired format to be specified for transfer of the results. |
| Feedback | Optional | Allows a status report to be requested via the requesting application AP1 on the chip card. |

TABLE 3

Possible information elements in Acknowledgement of Receipt_1 which the application AP2 can use to respond to the application AP1 (optionally).

| Information element | Presence | Description |
|---|---|---|
| Message type | Obligatory | Distinguishes this message as Acknowledgement of Receipt_1 |
| Transaction feature | Obligatory | Application-inherent identifier for this transaction. |
| Version code number | Optional | Allows a protocol version number to be specified. |
| Receiving instance ID | Obligatory | Identifies the requesting application on the chip card. |
| Status report | Optional | Indicates whether the request has been able to be executed as desired by application AP2. May contain an error code. |

In 904, the application AP2 844 forwards the information from the Discover_Available_AMPs command, having obtained said information via CAT/SAT/USAT, to the AMP manager 814 wholly or in part. For this purpose, the information may also be conditioned as appropriate for transmission via the I2 interface 824. The information is supplied to the AMP manager 814 via a dedicated SAP 830 (cf. information element "SAPI" in table 2). On the basis of the constraints contained in the Discover_Available_AMPs command (for example expressed by the information elements "Internal check" or "External check" in table 2, the AMP manager 814 ascertains all the locally available transmission/reception modules Cl1 816 to Cln 818 and/or all the available transmission/reception modules on adjacent appliances Cb1 to Cbn. The list obtained in this manner is returned by said manager in the desired output format (for example specified by the information element "Result format" in table 2) via the dedicated SAP 830 to the application AP2 844, where the data are conditioned on the basis of CAT/SAT/USAT. In line with one exemplary embodiment of the invention, the list produced by the AMP manager 814 contains an identification feature and an internal/external identifier for each transmission/reception module found. Alternatively, it is also possible for two separate lists (one for internal transmission/reception modules 816, 818 and one for external transmission/reception modules) having identification features to be returned.

TABLE 4

Possible information elements in the message Discovered_AMPs which are transferred from an application AP2 (mobile radio terminal) via the CAT/SAT/USAT interface I1 to an application AP1 (mobile radio chip card).

| Information element | Presence | Description |
| --- | --- | --- |
| Message type | Obligatory | Distinguishes this message as Discovered_AMPs. |
| Transaction feature | Obligatory | Application-inherent identifier for this transaction. |
| Version code number | Optional | Allows a protocol version number to be specified. |
| SAPI | Obligatory | Identifies the service access point (SAP) of the Bluetooth core layer from which this information originates. |
| Sending instance ID | Obligatory | Identifies the sending application in the mobile radio terminal. |
| AMP manager ID | Optional | Identifies the AMP manager. |
| Bluetooth device address | Optional | Allows the BD-ADDR to be specified in line with the Bluetooth specification. |
| Internal result list | Optional | Identification features of all the detected local transmission/reception modules. |
| External result list | Optional | Identification features of all the detected available transmission/reception modules on adjacent appliances. |
| Time stamp | Optional | Time information regarding when available transmission/reception modules were detected. |
| Feedback | Optional | Allows a status report to be requested by the requesting application AP2 in the mobile radio terminal. |

In 906, the application AP2 844 uses a first message of Discovered_AMPs type (solid arrow) to forward the data obtained from the AMP manager 814 to the intelligent mobile radio chip card 850 using CAP/SAT/USAT (table 4). For this, the information may be conditioned as appropriate again for transmission via the I1 846 interface from application AP2 844. The application AP1 848 can then optionally return a second message of Acknowledgement of Receipt_2 type to the mobile radio (dashed arrow) in order either to acknowledge the error-free receipt of the discovered_AMPs message or to report an erroneous transmission (including error code). Table 5 shows a possible structure for the second message of Acknowledgement of Receipt_2 type.

TABLE 5

Possible information elements in Acknowledgement of Receipt_2 which the application AP1 (mobile radio chip card) can use to respond (optional) to the application AP2 (mobile radio terminal).

| Information element | Presence | Description |
| --- | --- | --- |
| Message type | Obligatory | Distinguishes this message as Acknowledgement of Receipt_2 |
| Transaction feature | Obligatory | Application-inherent identifier for this transaction. |
| Version code number | Optional | Allows a protocol version number to be specified. |
| Receiving instance ID | Obligatory | Identifies the application in the mobile radio terminal |
| Status report | Optional | Indicates whether the message sent by application AP2 has reached the application AP1 without error. Possibly contains an error code. |

At time 908, application AP1 848 and hence also other applications on the intelligent mobile radio chip card, for example which are controlled by the network operator, have knowledge both about the locally available transmission/reception modules and about the available transmission/reception modules on adjacent appliances. Specifically, this means, by way of example, that application AP1 848 and other applications residing on the intelligent mobile radio chip card 850 can specifically address the AMP manager 814 in the Bluetooth host subsystem 810 of the mobile radio terminal 854 in order to obtain details of individual transmission/reception modules 816, 818 or in order to specifically influence the behavior of individual transmission/reception modules 816, 818.

B) Message Flowchart 1000: Report of a State Change

FIG. 10 shows the interchange of messages between the three main function blocks (application AP1 848, application AP2 844 and AMP manager 814) in the overall system 840, 860 for the purpose of reporting a change concerning the availability of local and/or adjacent transmission/reception modules. This case arises, by way of example, when a Bluetooth controller subsystem Cx has been connected to a Bluetooth host subsystem on the local or an adjacent appliance by means of a flexible cable connection (e.g. in the form of a USB dangle) and this cable connection has now been broken. If the remote Bluetooth controller subsystem Cx was connected to the local Bluetooth host subsystem, the local AMP manager 814 learns this immediately. If the remote Bluetooth controller subsystem Cx was connected to the Bluetooth host subsystem of an adjacent appliance, on the other hand, the local AMP manager 814 can thus be informed about this event via the air interface by virtue of another Bluetooth controller subsystem, which is still operational, being used, for example the legacy Bluetooth controller pair, which operates at 2.4 GHz (local individual identification feature: byte with the value '0').

In 1002, the local AMP manager 814 establishes that a local Bluetooth controller subsystem Clx 816, 818 has been removed, or that a Bluetooth controller subsystem Cbx is no longer available on an adjacent appliance.

TABLE 6

Possible information elements in the AMP_Configuration_Change message which are transferred from a local AMP manager via a dedicated SAP (and then via the interface I2) to an application AP2 (in the mobile radio terminal).

| Information element | Presence | Description |
|---|---|---|
| Message Type | Obligatory | Distinguishes this message as AMP_Configuration_Change. |
| Transaction feature | Obligatory | Application-inherent identifier for this transaction. |
| Version code number | Optional | Allows a protocol version number to be specified. |
| SAPI | Obligatory | Identifies the service access point (SAP) of the Bluetooth core layer from which this information originates. |
| Receiving instance ID | Obligatory | Identifies the receiving application in the mobile radio terminal. |
| AMP manager ID | Optional | Identifies the AMP manager. |
| Bluetooth device address | Optional | Allows the BD-ADDR to be specified according to the Bluetooth specification. |
| Internal event list | Optional | List or table of events which relate to the local transmission/reception modules (example: local AMP manager ID/local AMP number/local AMP status). |
| External event list | Optional | List or table of events which relate to transmission/reception modules on adjacent appliances (example: remote AMP manager ID/remote AMP number/remote AMP status). |
| Time stamp | Optional | Time information concerning when the change in the AMP configuration was detected. |
| Feedback | Optional | Allows a status report to be requested. |

In 1004, the local AMP manager 814 informs the application AP2 844 about the event which has occurred in 1002 using the AMP_Configuration_Change command.

Table 6 shows a few information elements which, according to various exemplary embodiments of the invention, should be contained at least in the message of AMP_Configuration_Change type. Accordingly, the application AP2 844 may optionally return a second message of Acknowledgement of Receipt_3 type to the AMP manager 814 (dashed arrow) in order either to acknowledge the error-free receipt of the AMP_Configuration_Change message or in order to report an erroneous transmission (including error code). Table 7 shows a possible structure for said second message. Both of these messages are interchanged using a dedicated SAP, such as the SAPext.

TABLE 7

Possible information elements in Acknowledgement of Receipt_3 which the application AP2 can use to respond to the AMP manager (optional).

| Information element | Presence | Description |
|---|---|---|
| Message Type | Obligatory | Distinguishes this message as Acknowledgement of Receipt 3 |
| Transaction feature | Obligatory | Application-inherent identifier for this transaction. |
| Version code number | Optional | Allows a protocol version number to be specified. |
| Sending instance ID | Obligatory | Identifies the application in the mobile radio terminal. |
| AMP manager ID | Optional | Identifies the AMP manager. |
| Status report | Optional | Indicates whether the message sent by the AMP manager has reached the application AP2 without error. Possibly contains an error code. |

In 1006, the application AP2 844 possibly conditions the information received in 1004 for transmission via the I1 interface 846 as appropriate. Next, application AP2 844 uses the message of AMP_Configuration_Change_2 type to send the previously received information—possibly slightly modified—to the intelligent mobile radio chip card 850 via the interface I1 846 using CAT/SAT/USAT (table 8).

TABLE 8

Possible information elements in the AMP_Configuration_Change_2 message which are transferred from application AP2 (mobile radio terminal) to an application AP1 848 (mobile radio chip card) via the CAT/SAT/USAT interface I1.

| Information element | Presence | Description |
|---|---|---|
| Message Type | Obligatory | Distinguishes this message as AMP_Configuration_Change 2. |
| Transaction feature | Obligatory | Application-inherent identifier for this transaction. |
| Version code number | Optional | Allows a protocol version number to be specified. |
| SAPI | Obligatory | Identifies the service access point (SAP) of the Bluetooth core layer from which this information originates. |
| Receiving instance ID | Obligatory | Identifies the receiving application on the chip card. |
| Sending instance ID | Obligatory | Identifies the application in the mobile radio terminal. |
| AMP manager ID | Optional | Identifies the AMP manager. |
| Bluetooth device address | Optional | Allows the BD-ADDR to be specified according to the Bluetooth specification |
| Internal event list | Optional | List or table of events which relate to the local transmission/reception modules (example: local AMP manager ID/local AMP number/local AMP status). |

TABLE 8-continued

Possible information elements in the
AMP_Configuration_Change_2 message which are
transferred from application AP2 (mobile radio
terminal) to an application AP1 848 (mobile radio chip
card) via the CAT/SAT/USAT interface I1.

| Information element | Presence | Description |
|---|---|---|
| External event list | Optional | List or table of events which relate to transmission/reception modules on adjacent appliances (example: remote AMP manager ID/remote AMP number/remote AMP status). |
| Time stamp | Optional | Time information concerning when the change in the AMP configuration was detected. |
| Feedback | Optional | Allows a status report to be requested. |

TABLE 9

Possible information elements in
Acknowledgement of Receipt_4 which the application AP1
(mobile radio chip card) can use to respond to the
application AP2 844 (mobile radio terminal) (optional).

| Information element | Presence | Description |
|---|---|---|
| Message Type | Obligatory | Distinguishes this message as Acknowledgement of Receipt 4 |
| Transaction feature | Obligatory | Application-inherent identifier for this transaction. |
| Version code number | Optional | Allows a protocol version number to be specified. |
| Sending instance ID | Obligatory | Identifies the receiving application on the chip card. |
| Receiving instance ID | Obligatory | Identifies the application in the mobile radio terminal. |
| AMP manager ID | Optional | Identifies the AMP manager. |
| Status report | Optional | Indicates whether the message sent by application AP2 has reached the application AP1 without error. Possibly contains an error code. |

Table 9 shows a few information elements which, according to various exemplary embodiments of the invention, could be contained at least in the message of Acknowledgement of Receipt_4 type (dashed arrow in figure 1000).

At time 1008, the application AP1 848 and hence also other applications on the intelligent mobile radio chip card 850, for example which are controlled by the network operator, are aware of configuration changes concerning locally available transmission/reception modules or concerning available transmission/reception modules on adjacent appliances. Specifically, this means that application AP1 848 and other applications residing on the intelligent mobile radio chip card 850 can specifically address the AMP manager 814 in the Bluetooth host subsystem of the mobile radio terminal in order to react to these changes.

Receipt of a message of AMP_Configuration_Change_2_type, which contains the information

| Local AMP-Manager ID = '00000110' | Remote AMP Manager ID = '00110110' |
|---|---|
| Local AMP Number = '00000001' or Local AMP Status = 'unplugged' | Remote AMP Number = '00000011' Remote AMP Status = 'switched_off' | could, by way of example, prompt the application AP1 848 not to set up any further data transmissions via the local transmission/reception module identified directly (in the internal event list), e.g. the module 816, or not to initiate any further data transmissions via the local transmission/reception module which is connected to the transmission/reception module identified (in the external event list) on an adjacent appliance.

C) Message Chart 1100: Find Out Details of Particular Transmission/Reception Modules FIG. 11 shows the interchange of messages between the three main function blocks (application AP1 848, application AP2 844 and AMP manager 814) in the overall system 840, 860, with the aim of finding out particular details of the transmission/reception modules Cl1 816 to Cln 818 (the index 'l' stands for 'local') currently connected to the local Bluetooth host subsystem or of the transmission/reception modules Cb1 to Cbn (the index 'b' stands for 'adjacent') available in adjacent appliances. In the case of transmission/reception modules Cb1 to Cbn in adjacent appliances, this is ideally done via the conventional Bluetooth controller pair (local individual identification feature: byte with the value '0'), which operates at 2.4 GHz.

In 1102, the application AP1 848, which is located on an intelligent mobile radio chip card 850, for example, sends a message of Get_AMP_Info type to the mobile radio 854, which message, according to various exemplary embodiments of the invention, is intended to contain at least one of the pieces of information shown in table 10. Table 11 shows the possible structure of a suitable Acknowledgement of Receipt_5.

From a technical point of view, the intelligent mobile radio chip card 850 again, in this case too, first of all indicates to the mobile radio terminal ME 854 that it would like to send data to the mobile radio terminal 854. This then fetches the provided data (as part of the UICC Proactive Command functionality) using a Fetch command. For the purpose of simplification, however, FIG. 8 shows only two messages in 1102: the first message (solid arrow) is used to send the Get_AMP_Info command to the mobile radio 854, and the second message (dashed arrow) can be used to send an Acknowledgement of Receipt_5 (optional) from the mobile radio 854 to the intelligent mobile radio chip card 850 in order to acknowledge error-free receipt of the command or in order to report erroneous transmission (including an error code).

TABLE 10

Possible information elements in the
Get_AMP_Info message which are transferred from an
application AP1 (mobile radio chip card) to an
application AP2 (mobile radio terminal) via the
CAT/SAT/USAT interface I1.

| Information element | Presence | Description |
|---|---|---|
| Message Type | Obligatory | Distinguishes this message as Get_AMP_Info. |

TABLE 10-continued

Possible information elements in the
Get_AMP_Info message which are transferred from an
application AP1 (mobile radio chip card) to an
application AP2 (mobile radio terminal) via the
CAT/SAT/USAT interface I1.

| Information element | Presence | Description |
|---|---|---|
| Transaction feature | Obligatory | Application-inherent identifier for this transaction. |
| Version code number | Optional | Allows a protocol version number to be specified. |
| SAPI | Obligatory | Identifies the service access point (SAP) in the Bluetooth core layer. |
| AMP manager ID | Obligatory | Identifies the AMP manager. |
| Sending instance ID | Obligatory | Identifies the requesting application on the chip card. |
| Bluetooth device address | Optional | Allows the BD-ADDR to be specified according to the Bluetooth specification. |
| Internal checking list | Optional | Table which lists those local transmission/reception modules whose properties need to be checked (example: local AMP manager ID/local AMP number). |
| External checking list | Optional | Table which lists those transmission/reception modules on adjacent appliances whose properties need to be checked (example: remote AMP manager ID/remote AMP number). |
| Result format | Optional | Allows the desired format to be specified for transfer of the checking results. |
| Feedback | Optional | Allows a status report to be requested by the requesting application AP1 on the chip card. |

TABLE 11

Possible information elements in
Acknowledgment of Receipt_5 which the application AP2
(mobile radio terminal) can use to respond to the
application AP1 (mobile radio chip card) (optional).

| Information element | Presence | Description |
|---|---|---|
| Message Type | Obligatory | Distinguishes this message as Acknowledgement of Receipt 5 |
| Transaction feature | Obligatory | Application-inherent identifier for this transaction. |
| Version code number | Optional | Allows a protocol version number to be specified. |
| Receiving instance ID | Obligatory | Identifies the requesting application on the chip card. |
| Status report | Optional | Indicates whether the request has been able to be executed as desired by application AP2. Possibly contains an error code. |

In 1104, the application AP2 844 forwards the information from the Get_AMP_Info command, having obtained said information via the CAT/SAT/USAT interface I1 846, to the AMP manager 814 in full or in part. Previously, the information is possibly conditioned for transmission via the I2 interface 842 as appropriate. The information is supplied to the AMP manager 814 via a dedicated SAP 830 (cf. information element "SAPI" in table 10). On the basis of the constraints contained in the Get_AMP_Info command (for example expressed by the information elements "Internal checking list" or "External checking list" in table 10), the AMP manager 814 ascertains the desired properties of the referenced locally available transmission/reception modules Cl1 816 to Cln 818 and/or the desired properties of the referenced transmission/reception modules on adjacent appliances Cb1 to Cbn. The check results obtained in this manner are returned by the AMP manager in the desired output format (for example specified by the information element "Result format" in table 10) via the dedicated SAP 830 to the application AP2 844, where the data are possibly conditioned on the basis of CAT/SAT/USAT. According to various exemplary embodiments of the invention, the list produced by the AMP manager 814 is intended to contain an identification feature, an internal/external identifier and the ascertained properties of the individual transmission/reception modules. Alternatively, it is also possible for two separate lists (one for internal transmission/reception modules and one for external transmission/reception modules) of identification features and the ascertained properties to be returned.

TABLE 12

Possible information elements in the AMP_Info
message which are transferred from an application AP2
(mobile radio terminal) to an application AP2 (mobile
radio chip card) via the CAT/SAT/USAT interface I1.

| Information element | Presence | Description |
|---|---|---|
| Message Type | Obligatory | Distinguishes this message as AMP_Info. |
| Transaction feature | Obligatory | Application-inherent identifier for this transaction. |
| Version code number | Optional | Allows a protocol version number to be specified. |
| SAPI | Obligatory | Identifies the service access point (SAP) of the Bluetooth core layer from which this information originates. |
| Sending instance ID | Obligatory | Identifies the transmitting application in the mobile radio terminal. |
| AMP manager ID | Optional | Identifies the AMP manager. |
| Bluetooth device address | Optional | Allows the BD-ADDR to be specified according to the Bluetooth specification. |
| Properties of internal AMPs | Optional | List of properties of the local transmission/reception modules (Example: local AMP manager ID/local AMP number/AMP properties container). |
| Properties of external AMPs | Optional | List of properties of transmission/reception modules on adjacent appliances (example: remote AMP manager ID/remote AMP number/AMP properties container). |
| Time stamp | Optional | Time information concerning when the properties of the transmission/reception modules have been ascertained. |

TABLE 12-continued

Possible information elements in the AMP_Info message which are transferred from an application AP2 (mobile radio terminal) to an application AP2 (mobile radio chip card) via the CAT/SAT/USAT interface I1.

| Information element | Presence | Description |
| --- | --- | --- |
| Feedback | Optional | Allows a status report to be requested by the requesting application AP2 in the mobile radio terminal. |

In 1106, the application AP2 844 uses a first message of AMP_Info type (solid arrow) to forward the data obtained from the AMP manager 814 to the intelligent mobile radio chip card 850 via the CAT/SAT/USAT interface I1 846 (table 12). The application AP1 848 can then optionally return a second message of Acknowledgement of Receipt_6 type to the mobile radio 854 via the CAT/SAT/USAT interface I1 846 (dashed arrow) in order either to acknowledge error-free reception of the AMP_Info message or to report an erroneous transmission (including error code). Table 13 shows a possible structure for the second message of Acknowledgement of Receipt_6 type.

TABLE 13

Possible information elements in Acknowledgement of Receipt_6 which the application AP2 can use to respond to the application AP1 (optional).

| Information element | Presence | Description |
| --- | --- | --- |
| Message Type | Obligatory | Distinguishes this message as Acknowledgement of Receipt_6 |
| Transaction feature | Obligatory | Application-inherent identifier for this transaction. |
| Version code number | Optional | Allows a protocol version number to be specified. |
| Receiving instance ID | Obligatory | Identifies the application in the mobile radio terminal |
| Status report | Optional | Indicates whether the message sent by application AP2 has reached the application AP1 without error. Possibly contains an error code. |

The information elements "properties of internal AMPs" and "properties of external AMPs" may have the following structure according to various exemplary embodiments of the invention:
Local-AMP-Manager ID='00000110'
Local-AMP-Number='00000001'
AMP-Properties-Container
wherein the "AMP Properties Container" is in turn intended to include at least one of the data blocks described in table 14.

TABLE 14

Possible structure of an "AMP Properties container"

| Name | Type | Value range | Description |
| --- | --- | --- | --- |
| AMP_Status | Token | "ON" or "OFF" | "ON" indicates that the relevant transmission/reception module is switched on or operational. "OFF" indicates that the relevant transmission/reception module is switched off or is in power-saving mode. |
| AMP_Type | Token | 2.4 GHz, WiMedia, 802.11, etc. | Specifies the type of the relevant transmission/reception module. |
| Free_BW | Integer | 4 octets: 0x00000000 0xFFFFFFFE (where 0xFFFFFFFF represents "unknown") | Estimate of the maximum available bandwidth for the relevant transmission/reception module. Indicated in kbps, for example. This field only needs to be interpreted if AMP_Status is set to "ON". |
| Min_Data_Size | Integer | 4 octets: 0x00000000-0xFFFFFFFF (where 0x00000000 represents "any") | To increase energy efficiency, it is possible to specify a threshold value for the data rate. The relevant transmission/reception module is not activated until this threshold value is exceeded. |

TABLE 14-continued

Possible structure of an "AMP Properties container"

| Name | Type | Value range | Description |
| --- | --- | --- | --- |
| AMP_Block | Octet string | Variable | Data block which can include further characteristic parameters of the relevant transmission/reception module, for example in order to indicate alternatively supported data rates, frequency ranges or power schemes. |

At time 1108, application AP1 848 and hence also other applications on the intelligent mobile radio chip card 850 which are controlled by the network operator, for example, are aware both of the properties of the local transmission/reception modules 816, 818 and of the properties of the transmission/reception modules on adjacent appliances. Specifically, this means that application AP1 848 and other applications residing on the intelligent mobile radio chip card can address and control the AMP manager 814 in the Bluetooth host subsystem 810 of the mobile radio terminal 854 on the basis of optimum information when they wish to use the service of a particular transmission/reception module. In particular, the method according to one exemplary embodiment of the invention can be used to control the operation of all transmission/reception modules for the next generation of Bluetooth wireless technology on the basis of location (country, region, radio cell, on the basis of GPS coordinates, etc.), since the location of the mobile radio terminal 854 on an intelligent mobile radio chip card 850 can be ascertained in different ways with different levels of accuracy.

D) Management of a Physical Link (Physical AMP Link)

FIG. 12 shows the interchange of messages between the three main function blocks (application AP1 848, application AP2 844 and AMP manager 814) in the overall system 840, 860, with the aim of initiating and clearing down a physical link via an available transmission/reception module pair (AMP pair). In this case, a prerequisite is that the details about the relevant transmission/reception module pair have already been ascertained on the basis of the above explanations. Ideally, the connection is set up and cleared down using the conventional Bluetooth controller pair, which operates at 2.4 GHz (local individual identification feature: byte with the value "0").

In 1202, the application AP1 848, which is on an intelligent mobile radio chip card 850, for example, sends a message of Manage_AMP_Link type, which, according to the invention, could contain at least one of the pieces of information shown in table 15, to the mobile radio 854. Table 16 shows the possible structure of a suitable Acknowledgement of Receipt_7.

In 1204, the application AP2 844 forwards the information from the Manage_AMP_Link command, having obtained said information via the CAT/SAT/USAT interface I1 846, to the AMP manager 814 in full or in part. Previously, the information are possibly conditioned as appropriate for transmission via the I2 interface 842. The information is supplied to the AMP manager 814 via a dedicated SAP (cf. information element "SAPI" in table 15). On the basis of the control commands contained in the Manage_AMP_Link command (expressed by the information element "Link Command"), the local AMP manager 814 provides for a physical link to be set up and cleared down. Next, it can use the dedicated SAP to return feedback to the application AP2 844, where these data may be subjected to CAT/SAT/USAT-based conditioning for further transmission via the interface 11846.

TABLE 15

Possible information elements in the Manage_AMP_Link message which are transferred from an application AP1 (mobile radio chip card) to an application AP2 (mobile radio terminal) via the CAT/SAT/USAT interface I1.

| Information element | Presence | Description |
| --- | --- | --- |
| Message Type | Obligatory | Distinguishes this message as Manage_AMP_Link. |
| Transaction feature | Obligatory | Application-inherent identifier for this transaction. |
| Version code number | Optional | Allows a protocol version number to be specified. |
| SAPI | Optional | Identifies the service access point (SAP) in the Bluetooth core layer. |
| Local Bluetooth device address | Optional | Allows the BD-ADDR to be specified according to the Bluetooth specification for the local terminal. |
| Local AMP manager ID | Obligatory | Identifies the local AMP manager. |
| Local AMP number | Obligatory | Identifies the local transmission/reception module |
| Remote Bluetooth device address | Optional | Allows the BD-ADDR to be specified according to the Bluetooth specification for the adjacent terminal. |
| Remote AMP manager ID | Optional | Identifies the AMP manager in the adjacent appliance. |
| Remote AMP number | Optional | Identifies the transmission/reception module in the adjacent appliance. |
| Sending instance ID | Obligatory | Identifies the requesting application on the chip card. |
| Link command | Obligatory | Indicates whether a physical link needs to be set up or cleared down. Possible values: 'Create_Link' or 'disconnect_link' |
| Physical Link ID | Optional | Allows an identification feature for a physical link (for example that |

TABLE 15-continued

Possible information elements in the
Manage_AMP_Link message which are transferred from an
application AP1 (mobile radio chip card) to an
application AP2 (mobile radio terminal) via the
CAT/SAT/USAT interface I1.

| Information element | Presence | Description |
| --- | --- | --- |
| | | link which needs to be cleared down) to be specified. |
| Feedback | Optional | Allows a status report to be requested by the requesting application AP2 in the mobile radio. |

TABLE 16

Possible information elements in the
Acknowledgement of Receipt_7 which the AMP manager can
use to respond to the application AP2 (optional).

| Information element | Presence | Description |
| --- | --- | --- |
| Message Type | Obligatory | Distinguishes this message as Acknowledgement of Receipt_7 |
| Transaction feature | Obligatory | Application-inherent identifier for this transaction. |
| Version code number | Optional | Allows a protocol version number to be specified. |
| Receiving instance ID | Obligatory | Identifies the requesting application in a mobile radio. |
| Physical Link ID | Optional | Allows an identification feature for a physical link (for example for a currently set up physical link) to be specified. |
| Status report | Optional | Indicates whether the request has been able to be performed as desired by the AMP manager. Possibly contains an error code. |

In 1206, the application AP2 844 uses a first message of Manage_AMP_Link_Feedback type (solid arrow) to forward the feedback obtained from the AMP manager 814 to the intelligent mobile radio chip card 850 via the CAT/SAT/USAT interface I1 846 (table 17). The application AP1 848 can then optionally return a second message of Acknowledgement of Receipt_8 type to the mobile radio via the CAT/SAT/USAT interface I1 846 (dashed arrow) in order to acknowledge error-free receipt of the Manage_AMP_Link_Feedback message or in order to report erroneous transmission (including error code). Table 18 shows a possible structure of the second message of Acknowledgement of Receipt_8 type.

TABLE 17

Possible information elements in the
Manage_AMP_Link_Feedback message which are transferred
from an application AP2 844 (mobile radio terminal) to
an application AP1 (mobile radio chip card) via the
CAT/SAT/USAT interface I1.

| Information element | Presence | Description |
| --- | --- | --- |
| Message Type | Obligatory | Distinguishes this message as Manage_AMP_Link_Feedback. |
| Transaction feature | Obligatory | Application-inherent identifier for this transaction. |
| Version code number | Optional | Allows a protocol version number to be specified. |
| SAPI | Obligatory | Identifies the service access point (SAP) of the Bluetooth core layer from which this information originates. |
| Local Bluetooth device address | Optional | Allows the BD-ADDR to be specified according to the Bluetooth specification for the local terminal. |
| Local AMP manager ID | Obligatory | Identifies the local AMP manager. |
| Local AMP number | Obligatory | Identifies the local transmission/reception module |
| Remote Bluetooth device address | Optional | Allows the BD-ADDR to be specified according to the Bluetooth specification for the adjacent terminal. |
| Remote AMP manager ID | Optional | Identifies the AMP manager in the adjacent appliance. |
| Remote AMP number | Optional | Identifies the transmission/reception module in the adjacent appliance. |
| Sending instance ID | Obligatory | Identifies the sending application in the mobile radio terminal. |
| Time stamp | Optional | Time information: indicates when a physical link has been set up or cleared down. |
| Physical link ID | Optional | Allows an identification feature for a physical link (for example for a currently set up or cleared down physical link) to be specified. |
| Feedback | Optional | Status report. Possibly contains an error code. |

TABLE 18

Possible information elements in
Acknowledgement of Receipt_8 which the application AP1
can use to respond to the application AP2 (optional).

| Information element | Presence | Description |
| --- | --- | --- |
| Message Type | Obligatory | Distinguishes this message as Acknowledgement of Receipt_8 |
| Transaction feature | Obligatory | Application-inherent identifier for this transaction. |
| Version code number | Optional | Allows a protocol version number to be specified. |
| Receiving instance ID | Obligatory | Identifies the application in the mobile radio terminal |

TABLE 18-continued

Possible information elements in
Acknowledgement of Receipt_8 which the application AP1
can use to respond to the application AP2 (optional).

| Information element | Presence | Description |
| --- | --- | --- |
| Status report | Optional | Indicates whether the message sent by application AP2 has reached the application AP1 without error. Possibly contains an error code. |

E) Message Chart 1300: Management of a Logical Channel (Logical AMP Channel)

FIG. 13 shows the interchange of messages between the three main function blocks (application AP1 848, application AP2 844 and AMP manager 814) in the overall system 840, 860, with the aim of managing a logical channel. In this connection, the term "management" should be understood to mean setting up, clearing down and relocating a logical channel.

In 1302, the application AP1 848, which is located on an intelligent mobile radio chip card 850, for example, sends a message of Manage_AMP_Channel type, which, according to various exemplary embodiments of the invention, is intended to contain at least one of the pieces of information shown in table 19, to the mobile radio 854. In this connection, the information elements "Channel Command", "Physical Link ID", "Logical Channel ID" and "Target Physical Link ID" should be highlighted for the "management of a logical channel" functionality.

Setting up a channel: the two information elements "Channel Command" and "Physical Link ID" can be used, by way of example, to set up a new logical channel (via an existing physical link) (Channel Command="Create_Channel"). The identification feature can be returned in the "Logical Channel ID" information element.

Clearing down a channel: the information elements "Channel Command" and "Logical Channel ID" (and optionally "Physical Link ID") can be used, by way of example, to clear down an existing logical channel (via a known physical link) (Channel Command='Disconnect_Channel').

Relocating a channel: in addition, the information elements "Channel Command", "Physical Link ID", "Logical Channel ID" and "Target Physical Link ID" can be used to shift an existing logical channel from a first existing physical link to a second existing physical link (Channel Command="Move_Channel")

Table 20 shows the possible structure of a suitable Acknowledgement of Receipt_9.

TABLE 19

Possible information elements in the
Manage_AMP_Channel message which are transferred from
an application AP1 (mobile radio chip card) to an
application AP2 (mobile radio terminal) via the
CAT/SAT/USAT interface I1.

| Information element | Presence | Description |
| --- | --- | --- |
| Message Type | Obligatory | Distinguishes this message as Manage_AMP_Channel. |
| Transaction feature | Obligatory | Application-inherent identifier for this transaction. |
| Version code number | Optional | Allows a protocol version number to be specified. |
| SAPI | Optional | Identifies the service access point (SAP) in the Bluetooth core layer. |
| Local Bluetooth device address | Optional | Allows the BD-ADDR to be specified according to the Bluetooth specification for the local terminal. |
| Local AMP manager ID | Obligatory | Identifies the local AMP manager. |
| Local AMP number | Optional | Identifies the local transmission/reception module. |
| Remote Bluetooth device address | Optional | Allows the BD-ADDR to be specified according to the Bluetooth specification for the adjacent terminal. |
| Remote AMP manager ID | Obligatory | Identifies the AMP manager in the adjacent appliance. |
| Remote AMP number | Optional | Identifies the transmission/reception module in the adjacent appliance. |
| Sending instance ID | Obligatory | Identifies the requesting application on the chip card. |
| Physical link ID | Optional | Identification feature of a physical link. |
| Channel command | Obligatory | Indicates whether a logical channel needs to be set up or cleared down or relocated. Possible values are: "Create_Channel" or "Disconnect_Channel" or "Move_Channel". |
| Target physical link ID | Optional | Identification feature of a physical link for the "Move Channel" command. |
| Logical channel ID | Optional | Allows that logical channel which needs to be cleared down or relocated, for example, to be specified. |
| Feedback | Optional | Allows a status report to be requested by the requesting application AP1 on the chip card. |

TABLE 20

Possible information elements in
Acknowledgement of Receipt_9, which the application AP2
can use to respond to the application AP1 (optional).

| Information element | Presence | Description |
| --- | --- | --- |
| Message Type | Obligatory | Distinguishes this message as Acknowledgement of Receipt_9 |

TABLE 20-continued

Possible information elements in
Acknowledgement of Receipt_9, which the application AP2
can use to respond to the application AP1 (optional).

| Information element | Presence | Description |
|---|---|---|
| Transaction feature | Obligatory | Application-inherent identifier for this transaction. |
| Version code number | Obligatory | Allows a protocol version number to be specified. |
| Receiving instance ID | Obligatory | Identifies the requesting application on the chip card. |
| Logical channel ID | Optional | Allows an identification feature for a logical channel (for example for a currently set up logical channel) to be specified. |
| Status report | Optional | Indicates whether the request has been able to be performed as desired by application AP2. Possibly contains an error code. |

In 1304, the application AP2 844 forwards the information from the Manage_AMP_Channel command, having obtained said information via the CAT/SAT/USAT interface I1 846, to the AMP manager 814 in full or in part. Previously, the information is possibly conditioned as appropriate for transmission via the I2 interface 842. The information is supplied to the AMP manager 814 via a dedicated SAP (cf. information element "SAPI" in table 19). On the basis of the control commands contained in the Manage_AMP_Channel message (expressed primarily by the information element "Channel Command"), the local AMP manager 814 provides for a logical channel to be set up, cleared down or relocated. Next, it can use the dedicated SAP 830 to return feedback to the application AP2 844, where these data are possibly subject to CAT/SAT/USAT-based conditioning for further transmission via the interface I1 846.

In 1306, the application AP2 844 uses a first message of Manage_AMP_Channel_Feedback type (solid arrow) to forward the feedback obtained from the AMP manager 814 to the intelligent mobile radio chip card 850 via the CAT/SAT/USAT interface I1 846 (table 21). The application AP1 848 can then optionally return a second message of Acknowledgement of Receipt_10 type to the mobile radio 854 via the CAT/SAT/USAT interface I1 846 (dashed arrow) in order to acknowledge error-free receipt of the Manage_AMP_Channel_Feedback message or in order to report erroneous transmission (including error code). Table 22 shows a possible structure for the second message of Acknowledgement of Receipt_10 type.

TABLE 21

Possible information elements in the
Manage_AMP_Channel_Feedback message which are
transferred from an application AP2 (mobile radio
terminal) to an application AP1 (mobile radio chip
card) via the CAT/SAT/USAT interface I1.

| Information element | Presence | Description |
|---|---|---|
| Message Type | Obligatory | Distinguishes this message as Management_AMP_Channel_Feedback |
| Transaction feature | Obligatory | Application-inherent identifier for this transaction. |
| Version code number | Optional | Allows a protocol version number to be specified. |
| SAPI | Obligatory | Identifies the service access point (SAP) of the Bluetooth core layer from which this information originates. |
| Local Bluetooth device address | Optional | Allows the BD-ADDR to be specified according to the Bluetooth specification for the local terminal. |
| Local AMP manager ID | Optional | Identifies the local AMP manager. |
| Local AMP number | Optional | Identifies the local transmission/reception module. |
| Remote Bluetooth device address | Optional | Allows the BD-ADDR to be specified according to the Bluetooth specification for the adjacent terminal. |
| Remote AMP manager ID | Optional | Identifies the AMP manager in the adjacent appliance. |
| Remote AMP number | Optional | Identifies the transmission/reception module in the adjacent appliance. |
| Sending instance ID | Obligatory | Identifies the sending application in the mobile radio terminal. |
| Time stamp | Optional | Time information: indicates when a logical channel has been set up or cleared down or relocated. |
| Logical Channel ID | Optional | Allows an identification feature for a logical channel (for example for a newly set up, cleared down or newly located logical channel) to be specified. |
| Feedback | Optional | Status report. |

TABLE 22

Possible information elements in
Acknowledgement of Receipt_10, which the application
AP1 can use to respond to the application AP2
(optional).

| Information element | Presence | Description |
|---|---|---|
| Message Type | Obligatory | Distinguishes this message as Acknowledgement of Receipt_10 |
| Transaction feature | Obligatory | Application-inherent identifier for this transaction. |
| Version code number | Optional | Allows a protocol version number to be specified. |
| Receiving instance ID | Obligatory | Identifies the application in the mobile radio terminal |
| Status report | Optional | Indicates whether the message sent by application AP2 has reached the application AP1 without error. Possibly contains an error code. |

To start with, the USIM initialization process based on the UMTS specification has already been described in brief.

This initialization process allows, inter alia, the services generally supported by the USIM (USIM service table request) or the services currently enabled by the USIM (USIM enabled services table request) to be requested by the mobile radio terminal.

So that the method described—particularly the variant shown in FIG. 8B (overall system ME 840), where the trustworthy application AP1 848 for specifically influencing the Bluetooth functionality is stored on an intelligent mobile radio chip card 850—works reliably, one exemplary embodiment of the invention also makes a few additions in the USIM service tables, said additions being described in detail below with reference to FIG. 14. Services #06 to #69 are not shown, for reasons of better clarity. Furthermore, only the list of services generally supported by the USIM (USIM service table request) is discussed at this juncture. Services #75 "basic Bluetooth AMP control" and #76 "advanced Bluetooth AMP control" 1402 are novel according to various exemplary embodiments of the invention. Transfer of these two entries to the list of services currently enabled by the USIM (USIM enabled services table request) is self-explanatory.

A distinction between "basic Bluetooth AMP control" (service #75) and "advanced Bluetooth AMP control" (service #76) makes sense in so far as "advanced Bluetooth AMP control" can be understood to mean the inclusion of a functional unit (for example a GPS module) which is located in the access range of the intelligent mobile radio chip card (and hence likewise trustworthy) for the purpose of determining the whereabouts of the mobile radio terminal (country, region, city, radio cell, etc.), whereas a USIM, which merely provides "basic Bluetooth AMP control", cannot provide this functionality.

Although the invention has been shown and described primarily in connection with specific exemplary embodiments, it should be understood by those persons familiar with the subject that diverse changes to the configuration and details can be made for it without departing from the essence and scope of the invention as defined by the claims which follow. The field of the invention is therefore determined by the appended claims, and the intention is that all alterations which are within the range of meaning and equivalent scope of the claims are covered by the claims.

The invention claimed is:

1. An ad-hoc communication radio module apparatus, comprising:
   an ad-hoc communication-protocol-stack-external control interface to receive a command, from an application external to an ad-hoc communication protocol stack of the ad-hoc communication radio module apparatus, wherein the ad-hoc communication protocol stack includes an application layer and the application runs outside of the application layer;
   a first radio module coupled with the ad-hoc communication-protocol-stack-external control interface, the first radio module including a first ad-hoc communication reception circuit or a first ad-hoc communication transmission circuit; and
   a second radio module coupled with the ad-hoc communication-protocol-stack-external control interface, the second radio module comprising:
      a Medium Access Control (MAC) layer; and
      a Physical Layer (PHY) including a second communication reception circuit or a second communication transmission circuit, wherein the first radio module and the second radio module are selectively controlled in accordance with the received command, and wherein the command specifies that a particular logical channel should be set up, transferred to a different physical link, or cleared.

2. The ad-hoc communication radio module apparatus as claimed in claim 1,
   wherein the ad-hoc communication-protocol-stack-external control interface has a plurality of ad-hoc communication-protocol-stack-external service access points.

3. The ad-hoc communication radio module apparatus as claimed in claim 1,
   wherein the first radio module is set up based on Bluetooth or Zigbee.

4. The ad-hoc communication radio module apparatus as claimed in claim 1, further comprising a controller coupled to the ad-hoc communication-protocol-stack-external control interface, the first radio module, and the second radio module, wherein the controller is configured to control the first radio module and also the second radio module, based at least in part on the received command.

5. The ad-hoc communication radio module apparatus as claimed in claim 4,
   wherein the second radio module is set up on the basis of a different radio technology than the first radio module.

6. The ad-hoc communication radio module apparatus as claimed in claim 5,
   wherein the second radio module is set up based on ultra wideband radio technology or wireless local area network radio technology.

7. The ad-hoc communication radio module apparatus of claim 1, wherein the command specifies that a particular logical channel should be transferred from a first physical link to a second physical link.

8. The ad-hoc communication radio module apparatus of claim 7, wherein the first physical link is associated with the first radio module and the second physical link is associated with the second radio module.

9. An ad-hoc communication device, comprising:
   an ad-hoc communication radio module apparatus comprising:
      an ad-hoc communication-protocol-stack-external control interface to receive a command, from an application external to an ad-hoc communication protocol stack of the ad-hoc communication radio module apparatus, wherein the ad-hoc communication protocol stack includes an application layer and the application runs outside of the application layer;
      a first radio module coupled with the ad-hoc communication-protocol-stack-external control interface, the first radio module including a first ad-hoc communication reception circuit or a first ad-hoc communication transmission circuit; and
      a second radio module coupled with the ad-hoc communication-protocol-stack-external control interface, the second radio module comprising:
         a Medium Access Control (MAC) layer; and
         a Physical Layer (PHY) including a second communication reception circuit or a second communication transmission circuit, wherein the first radio module and the second radio module are selectively controlled in accordance with the received command, and wherein the command specifies that a particular logical channel should be set up, transferred to a different physical link, or cleared; and
      a memory for storing the application external to the ad-hoc communication protocol stack of the ad-hoc communication radio module apparatus for the control of the first radio module or of the second radio module.

10. The ad-hoc communication device as claimed in claim 9, wherein the application is an application which the first radio module considers trustworthy.

11. The ad-hoc communication device as claimed in claim 9, wherein the second communication reception circuit is a mobile radio communication reception circuit and the second communication transmission circuit is a mobile radio communication transmission circuit.

12. The ad-hoc communication device as claimed in claim 11, wherein the mobile radio communication reception circuit or the mobile radio communication transmission circuit is set up based on a second-generation mobile radio technology or a third-generation mobile radio technology.

13. The ad-hoc communication device as claimed in claim 11, wherein the mobile radio communication reception circuit or the mobile radio communication transmission circuit is set up based on one of the following mobile radio technologies:
Global System for Mobile Communications mobile radio technology;
Universal Mobile Telecommunication System mobile radio technology;
Code Division Multiple Access mobile radio technology;
Code Division Multiple Access 2000 mobile radio technology; and
Freedom of Mobile Multimedia Access mobile radio technology.

14. The ad-hoc communication device as claimed in claim 9, wherein the second communication reception circuit is a cordless communication reception circuit and the second communication transmission circuit is a cordless communication transmission circuit.

15. The ad-hoc communication device as claimed in claim 14, wherein the cordless communication reception circuit or the cordless communication transmission circuit is set up based on one of the following mobile radio technologies:
Digital Enhanced Cordless Telecommunication cordless technology;
Wideband Digital Enhanced Cordless Telecommunication cordless technology;
Cordless Telephony 2 cordless technology; and
Cordless Advanced Technology—Internet and quality cordless technology.

16. The ad-hoc communication device as claimed in claim 9, further comprising:
a user identification element interface for communication with a user identification element of a user of the ad-hoc communication device, wherein the user identification element interface is coupled to the ad-hoc communication-protocol-stack-external control interface.

17. The ad-hoc communication device of claim 9, wherein the command specifies that a particular logical channel should be transferred from a first physical link to a second physical link.

18. The ad-hoc communication device of claim 17, wherein the first physical link is associated with the first radio module and the second physical link is associated with the second radio module.

19. A method for controlling an ad-hoc communication radio module apparatus, the method comprising:
generating, by an application external to an ad-hoc communication protocol stack of the ad-hoc communication radio module apparatus, control information including a command, wherein the ad-hoc communication protocol stack includes an application layer and the application runs outside of the application layer;
transmitting the control information to a controller coupled with an ad-hoc communication-protocol-stack-external control interface via the ad-hoc communication-protocol-stack-external control interface; and
controlling selectively a first radio module coupled with the controller and a second radio module coupled with the controller based at least in part on the control information, wherein the first radio module includes a first ad-hoc communication reception circuit or a first ad-hoc communication transmission circuit and the second radio module comprises a Medium Access Control (MAC) layer, and a Physical Layer (PHY) having a second communication reception circuit or a second communication transmission circuit.

20. The method as claimed in claim 19, wherein the ad-hoc communication-protocol-stack-external control interface has a plurality of ad-hoc communication-protocol-stack-external service access points.

21. The method as claimed in claim 19, wherein the first radio module is set up based on Bluetooth or Zigbee.

22. The method of claim 19, wherein the ad-hoc communication-protocol-stack-external control interface is to only accept commands from applications controlled by a Trusted Platform Module.

23. The method of claim 19, wherein the ad-hoc communication-protocol-stack-external control interface is to only accept commands from applications controlled by network operators on a mobile radio chipcard.

24. The method of claim 19, wherein the control information specifies that a logical channel should be transferred from a first physical link associated with the first radio module to a second physical link associated with the second radio module.

25. The method of claim 19, wherein the control information requests details of transmission/reception modules present in the ad-hoc communication radio module apparatus.

* * * * *